(12) United States Patent
Graham et al.

(10) Patent No.: US 8,369,661 B2
(45) Date of Patent: Feb. 5, 2013

(54) OPTICAL MULTIPLEXER SYSTEM

(75) Inventors: Alan Graham, Cupertino, CA (US);
Enrique Chang, Pleasanton, CA (US);
George Tsai, San Jose, CA (US);
Reinhold Garbe, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 445 days.

(21) Appl. No.: 12/390,322

(22) Filed: Feb. 20, 2009

(65) Prior Publication Data

US 2010/0215364 A1    Aug. 26, 2010

(51) Int. Cl.
*G02B 6/28* (2006.01)
*G02B 6/26* (2006.01)
*G02B 6/32* (2006.01)
*G02B 6/34* (2006.01)

(52) U.S. Cl. ............... 385/24; 385/15; 385/31; 385/33; 385/36

(58) Field of Classification Search .................. None
See application file for complete search history.

(56) References Cited

U.S. PATENT DOCUMENTS

| | | | | |
|---|---|---|---|---|
| 6,801,684 | B2 * | 10/2004 | Losch | 385/18 |
| 7,035,025 | B2 | 4/2006 | Prince et al. | |
| 7,095,916 | B2 * | 8/2006 | Hagood et al. | 385/16 |
| 7,738,750 | B2 * | 6/2010 | Graham et al. | 385/24 |
| 2003/0123802 | A1 * | 7/2003 | Richard et al. | 385/47 |
| 2005/0244098 | A1 * | 11/2005 | Barrett | 385/17 |

* cited by examiner

*Primary Examiner* — Michelle R Connelly

(57) ABSTRACT

The optical multiplexer system comprises an optical multiplexer, an output path and an adjustable beam steering element. The optical multiplexer comprises an input port characterized by an original acceptance range. The output path is disposed relative to the optical multiplexer such that a light beam incident on the input port within the original acceptance range enters the output path. The adjustable beam steering element is located adjacent the input port and is adjustable such that a light beam incident on the beam steering element within an enhanced acceptance range enters the output path as an output beam. The enhanced acceptance range is at least angularly greater than the original acceptance range.

21 Claims, 11 Drawing Sheets

OPTICAL MULTIPLEXER SYSTEM

BACKGROUND

U.S. Pat. No. 7,738,750 assigned to the assignee of this disclosure and incorporated herein by reference discloses various embodiments of a compact, low-cost optical wavelength multiplexer/demultiplexer. Such embodiments will be referred to herein as multiplexers since they perform optical wavelength multiplexing or optical wavelength demultiplexing depending on the direction in which light travels through them. Accordingly, as used in this disclosure, the term multiplexer encompasses a multiplexer and a demultiplexer, the exact function depending on the direction in which the light travels. Similarly, the term multiplexing encompasses multiplexing and demultiplexing, depending on the direction in which the light travels.

The above-mentioned multiplexers output two or more light beams incident thereon at respective, different locations as at least one combined light beam that will be referred to herein as an output beam. In a typical application, the multiplexer outputs the output beam into an output path that conveys the output beam to a destination optical element. The output path typically comprises an optical fiber or other type of optical waveguide and is characterized by an acceptance range. An output beam incident on the output path within the acceptance range of the output path enters the output path and is conveyed by the output path to the destination optical element. The acceptance range of the output path has a spatial component and an angular component that interact such that the spatial component is at a maximum when the angular component is at a minimum and vice versa. In other embodiments, the output path comprises a free-space link to the destination optical element. In this case, the destination optical element has an acceptance range that defines the acceptance range of the output path.

The locations at which the light beams are incident on the multiplexer will be referred to as input ports. To ensure that each light beam incident on the optical multiplexer enters the output path after passing through the optical multiplexer, the light beam has to be accurately aligned relative to the input port both spatially and angularly such that the output beam output by the optical multiplexer is incident on the output path within the acceptance range of the output path. Each input port can be regarded as being characterized by an acceptance range. Light incident on the input port and output by the optical multiplexer such that the light is incident on the output path within the acceptance range of the output path is said to be within the acceptance range of the input port. The acceptance range of the input port has a spatial component and an angular component that interact such that the spatial component is at a maximum when the angular component is at a minimum and vice versa.

In a multiplexer without adjustments, such as the monolithic multiplexers shown in FIGS. 6A-6D and 7A-7D of the above-mentioned patent application, the acceptance range of the input ports has a fixed relationship to the acceptance range of the output path, although this relationship differs from example to example, depending on the orientation tolerance of the constituent beam splitting surfaces. In such multiplexers, the source of each light beam has to be adjusted spatially and angularly to align the light beam incident on the input port so that the light beam is incident within the acceptance range of the input port. The source of the light beam is typically a laser, such as a gas laser or a semiconductor laser. Lasers, especially gas lasers, are typically bulky and heavy, which makes the adjustment process difficult. Moreover, if a light source fails in the field, the replacement light source has to be adjusted to align the light beam within the acceptance range of the input port.

In a non-monolithic multiplexer, such as the non-monolithic multiplexers shown in FIGS. 5A-5D of the above-mentioned patent application, an ability to adjust the components of the multiplexer spatially and angularly provides a variable relationship between the acceptance ranges of the input ports and the acceptance range of the output path. Consequently, such multiplexers are adjustable such their input ports have can have a substantially greater acceptance range than the input ports of a monolithic multiplexer. However, non-monolithic multiplexers are substantially larger than monolithic multiplexers, so that the output path is separated from the input port of the multiplexer by a larger distance. The increased distance makes the adjustments more critical. Moreover, the process of adjusting the components to compensate for spatial and angular differences between the light beam and the nominal location and direction of the input port is very complex because the adjustments interact. Adjustment times measured in hours are typical. Moreover, users of adjustable multiplexers on encountering a problem will often adjust the multiplexer in an attempt to correct the immediate problem for a particular wavelength or application. Such adjustment may well put the multiplexer further out of alignment for other wavelengths or applications, correction of which will then require a complete re-adjustment of the multiplexer.

In many applications, the output path to which the multiplexer outputs light includes a converging lens whose focusing effect substantially increases the spatial acceptance range of each input port. With such a lens, the acceptance range is approximately equal to the spatial range over which the lens has a spherical aberration less than the diameter of the optical waveguide. However, a lens does not provide a corresponding increase in angular acceptance range. Accordingly, conventionally, a highly-precise angular adjustment of either or both of the light source and the multiplexer is needed to ensure that the multiplexer outputs the light beam incident on each input port to the output path.

Accordingly, what is needed is a multiplexer that can be used without the need to perform highly precise spatial and angular adjustments of the light sources or without the need to perform precise and interactive adjustments of internal components of the multiplexer.

DETAILED DESCRIPTION

An embodiment of the invention provides an optical multiplexer system comprising an optical multiplexer, an output path and an adjustable beam steering element. The optical multiplexer comprises an input port characterized by an original acceptance range. The output path is disposed relative to the optical multiplexer such that light incident on the input port within the original acceptance range enters the output path. The beam steering element is located adjacent the input port, and is adjustable such that light incident on the beam steering element within an enhanced acceptance range enters the output path. The enhanced acceptance range is at least angularly greater than the original acceptance range. In some embodiments, beam steering element is additionally adjustable such that the enhanced acceptance range is also spatially greater than the original acceptance range. The greater acceptance range of the beam steering element obviates the need to adjust the light source or greatly simplifies the process of adjusting the light source. Suitably adjusted, a typical beam steering element allows light incident thereon within an acceptance range having a spatial component of the order of millimeters and an angular component of the order of degrees to be incident on the input port within the substantially smaller acceptance range thereof and therefore to enter the output path.

Optical multiplexer systems in accordance with various embodiments of the invention are described below with reference to examples that incorporate an optical multiplexer similar in structure to the optical multiplexer described in above-mentioned U.S. Pat. No. 7,738,750 with reference to FIGS. 7C and 7D. Optical multiplexer systems in accordance with other embodiments of the invention may incorporate other types of monolithic or non-monolithic optical multiplexers, including the optical multiplexers described with reference to others of the Figures of U.S. Pat. No. 7,738,750 and variations of such optical multiplexers.

Figure 1A:
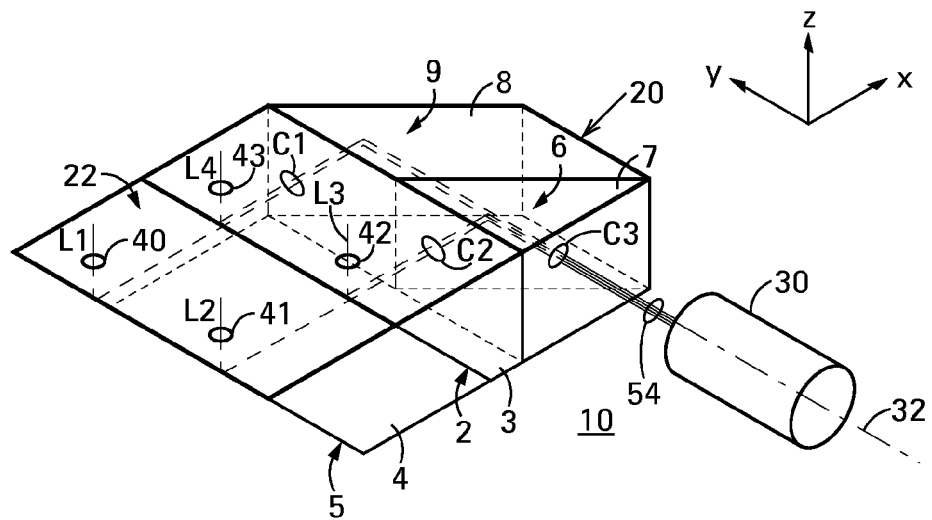
FIGS. 1A, 1B and 1C are an isometric view and two side views showing a conventional optical multiplexer system comprising an optical multiplexer similar to that shown in FIGS. 7C and 7D of U.S. Pat. No. 7,738,750.

FIG. 1A is an isometric view showing an optical multiplexer system 10 composed of an optical multiplexer 20 and an output path 30. Optical multiplexer 20 is similar to that described in above-mentioned U.S. Pat. No. 7,738,750 with reference to FIGS. 7C and 7D. Optical multiplexer 20 is composed of a first dichroic filter 2 located between the hypotenuse surface of a nominally triangular prism 3 and a first major surface of a rhomboidal prism 4. A second major surface of rhomboidal prism 4 parallel to the first major surface provides a first reflector 5. The major surfaces and the minor surfaces of a rhomboidal prism 4 are the surfaces of the prism opposite the obtuse and acute angles, respectively.

A second dichroic filter 6 is located between the hypotenuse surface of a triangular prism 7 and a first major surface of a rhomboidal prism 8. A second major surface of rhomboidal prism 8 parallel to the first major surface of rhomboidal prism 8 provides a second reflector 9. Each of rhomboidal prisms 4 and 8 typically has an acute angle of 45°. Each dichroic filter 2, 6 is an optical interference filter composed of multiple thin layers (not shown) of different dielectric materials of different thicknesses. Each dichroic filters 2, 6 has a one of a band-pass, band-stop, short-pass and long-pass transmission characteristic and reflects wavelengths that are not transmitted. Output path 30 has an optical axis 32.

Optical multiplexer 20 combines light beams L1-L4 incident on discrete regions of major surface 22 into a single combined beam C3 that the optical multiplexer outputs towards output path 30 as an output beam 54. The output beam 54 is incident on output path 30 at such a location of incidence and angle of incidence that the output beam enters the output path. Alternatively, optical multiplexer system 10 may operate as an optical demultiplexer. In this case, optical multiplexer 20 operates as an optical demultiplexer, and output path 30 operates as an input path.

In the example shown, the wavelengths of light beams L3 and L4 are within the one or more wavelength ranges reflected by first dichroic filter 2. Consequently, first dichroic filter 2 reflects light beam L3 and light beam L4 towards second dichroic filter 6 and second reflector 9, respectively. First reflector 5 reflects light beams L1 and L2 towards respective locations on first dichroic filter 2 where light beams L4 and L3, respectively, are incident. The wavelengths of light beams L1 and L2 are within the one or more wavelength ranges transmitted by first dichroic filter 2. Consequently, first dichroic filter 2 transmits light beam L1 and light beam L2 towards second reflector 9 and second dichroic filter 6, respectively. Light beam L1 transmitted by first dichroic filter 2 combines with light beam L4 reflected by the first dichroic filter to form a combined beam C1 that travels towards second reflector 9. Second reflector 9 reflects combined beam C1 towards second dichroic filter 6. Light beam L2 transmitted by first dichroic filter 2 combines with light beam L3 reflected by first dichroic filter 2 to form a combined beam C2 that travels towards the location on second dichroic filter 6 at which combined beam C1 is incident. Combined beam C1 transmitted by second dichroic filter 6 combines with combined beam C2 reflected by second dichroic filter 6 to form combined beam C3.

Figure 1B:
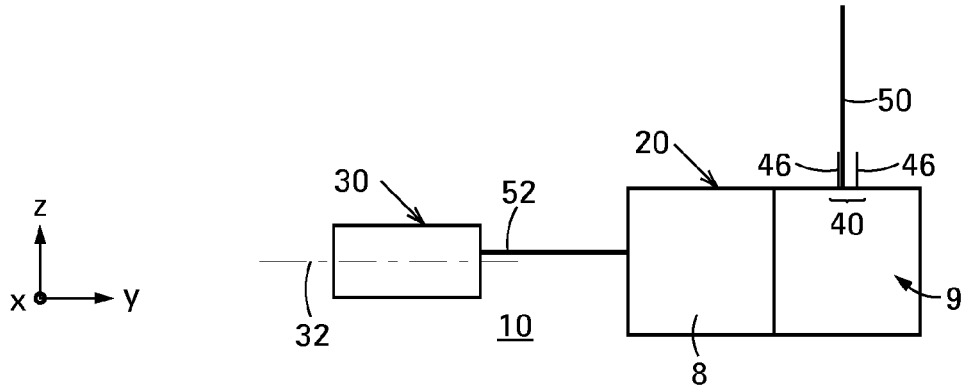
Figure 1C:
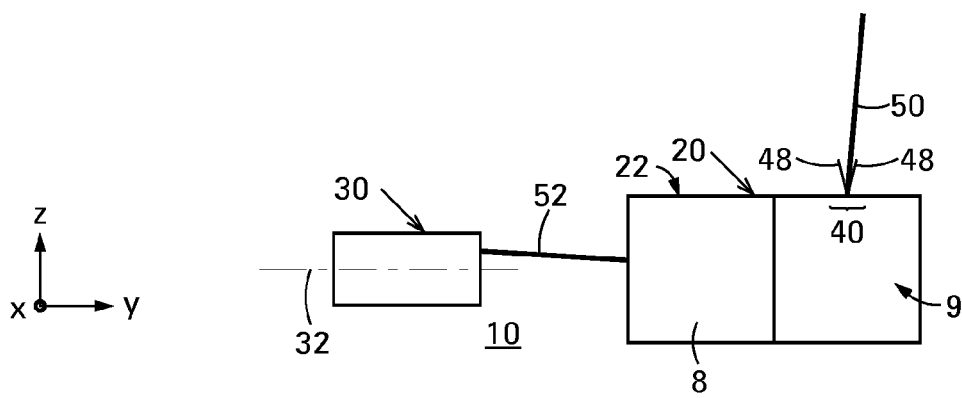

FIGS. 1B and 1C are side views of optical multiplexer system 10. Output path 30 is characterized by an acceptance range that has a spatial component and an angular component. Only light incident on output path 30 within the acceptance range of the output path will enter the output path and will be output from optical multiplexer system 10 via the output path.

Optical multiplexer 20 will only output light that is incident at a number of discrete regions of major surface 22 towards output path 30 within the acceptance range of the output path. Such regions will be referred to as input ports. The example of optical multiplexer 20 shown in FIG. 1A has four input ports 40-43, schematically represented by respective circles, on which light beams L1-L4, respectively, are incident. Others of the optical multiplexers described in U.S. Pat. No. 7,738,750 have different numbers of input ports. Input port 40 is characterized by an acceptance range. Light incident on input port 40 within the acceptance range of input port 40 will be incident on output path 30 within the acceptance range of the output path and will therefore enter the output path. The remaining input ports 41-43 are similarly characterized.

The acceptance range of input port 40 has a spatial component and an angular component. In FIG. 1B, lines 46 represent the spatial component of the acceptance range of input port 40. The spatial component is highly exaggerated in FIG. 1B to enable it to be shown clearly. FIG. 1B shows a light beam 50 incident on input port 40 at a location within the spatial component of the acceptance range of input port 40 and at the nominal angle of incidence of input port 40. Consequently, light beam 50 is output from optical multiplexer 20 as an output beam 52 that is incident on output path 30 within the acceptance range of the output path and therefore enters the output path. A deviation of the angle of incidence from the nominal angle of incidence reduces the spatial component of the acceptance range.

In FIG. 1C, lines 48 represent the angular component of the acceptance range of input port 40. The angular component is highly exaggerated in FIG. 1C to enable it to be shown clearly. FIG. 1C shows light beam 50 incident on input port 40 with an angle of incidence within the angular component of the acceptance range of input port 40 and at the nominal location of input port 40. Consequently, light beam 50 is output from optical multiplexer 20 as output beam 52 that is incident on output path 30 within the acceptance range of the output path and therefore enters the output path. The angle of incidence of light beam 50 is the angle between light beam 50 and a normal to the major surface 22 of optical multiplexer 20 through the nominal location of input port 40. A deviation of the location of incidence from the nominal location of input port 40 reduces the angular component of the acceptance range.

Light beam 50 is generated by a light source (not shown) and is output from the light source towards input port 40 from a location on the light source and in a direction of propagation that are typically not defined relative to the structure of the light source with a precision that guarantees that light beam 50 will be incident on input port 40 with a combination of location of incidence and angle of incidence within the acceptance range of input port 40. Alternatively, light is generated by a light source (not shown) and is transmitted to input port 40 by an optical waveguide system (not shown) typically composed of an optical waveguide with a collimator at each end. The optical waveguide system outputs the light towards input port 40 as light beam 50. Light beam 50 is output from a location on the optical waveguide system and in a direction of propagation that are typically not defined relative to the structure of the optical waveguide system with a precision that guarantees that light beam 50 will be incident on input port 40 with a combination of location of incidence and angle of incidence within the acceptance range of input port 40. Accordingly, the position and orientation of the light source or the optical fiber system has to be adjusted relative to multiplexer 20 until light beam 50 is incident on input port 40 within the acceptance range of input port 40. Performing this adjustment is typically tedious and time consuming. Moreover, the light beams (not shown) incident on the remaining input ports 41-43 of optical multiplexer 20 have similar characteristics and a similar adjustment has to be performed for the each light beam incident on a respective input port of multiplexer 20.

In embodiments in which optical multiplexer 20 comprises adjustable elements, as an alternative to adjusting the position and orientation of the light source or the optical waveguide system, the adjustable elements can be adjusted to change the acceptance range of input port 40 so that light beam 50 is within the acceptance range at least in part. Adjustment of the light source or optical waveguide system may additionally be necessary to bring light beam 50 completely within the acceptance range of the input port.

Figure 2A:
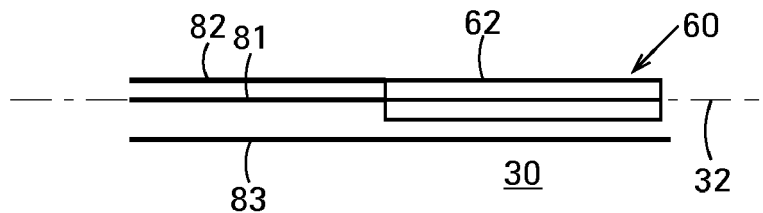
FIGS. 2A and 2B are side views showing an output path composed of an optical waveguide.
Figure 2B:
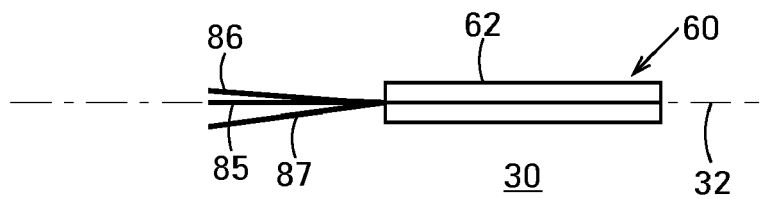

FIGS. 2A and 2B are schematic diagrams showing a first embodiment 60 of output path 30 in which output path 30 is composed simply of an optical waveguide 62. FIG. 2A shows three light beams 81, 82, 83 incident on output path 60 with a direction of incidence parallel to the optical axis 32 of optical waveguide 62 and at progressively greater lateral offsets from the optical axis 32 of the optical waveguide. Light beam 81 is aligned with optical axis 32 and is therefore output by output path 60. Whether light beam 82 and light beam 83 are output by output path 60 depends on whether the lateral offset of the respective light beam is within the spatial acceptance range of optical waveguide 62. In the example shown, light beam 82 is output by output path 60 but light beam 83 is not.

FIG. 2B shows three light beams 85, 86, 87 incident on output path 60 at progressively increasing angles of incidence relative to the optical axis 32 of the optical waveguide. Light beams 85, 86, 87 are incident on output path 60 at the optical axis 32 of optical waveguide 62. Light beam 85 is incident parallel to the optical axis of optical waveguide 82 and is therefore output by output path 60. Whether light beam 86 and light beam 87 are output by output path 60 depends on whether the angle of incidence of the respective light beam is within the angular acceptance range of optical waveguide 62. In the example shown, light beam 86 is output by output path 60 but light beam 87 is not.

Figure 3A:
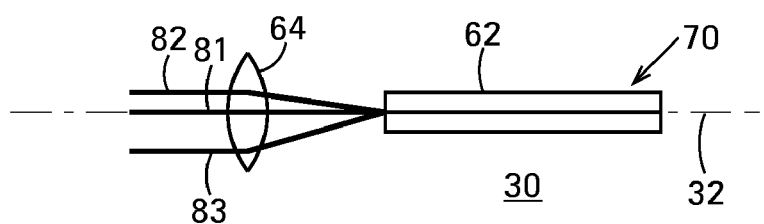
FIGS. 3A and 3B are side views showing an output path composed of an optical waveguide and a lens.
Figure 3B:
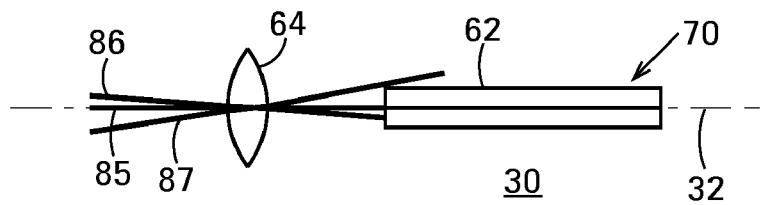

FIGS. 3A and 3B are schematic diagrams showing an example of a second embodiment 70 of output path 30 in which output path 30 is composed of optical waveguide 62 and a focusing lens 64. Lens 64 is positioned such that the proximal end of optical waveguide 62 is located at its focal point. In other examples, lens 64 is composed of two or more lenses or lens elements. FIG. 3A shows above-described light beams 81, 82, 83 incident on output path 70 with a direction of incidence parallel to the optical axis 32 of optical waveguide 62 and with progressively increasing offsets from optical axis 32. Notwithstanding the different lateral offsets of light beams 81, 82, 83 from optical axis 32, lens 64 focuses each of the light beams on the optical axis 32 of optical waveguide 62. The optical waveguide outputs those of the light beams whose lateral offsets meet the following conditions: (1) the lateral offset is less than a lateral offset at which the spherical aberration of lens 64 is below a threshold spherical aberration, (2) the lateral offset is less than the lateral offset at which the beam, after focusing, is incident on optical waveguide 62 at an angle of incidence outside the angular component of the acceptance range of optical waveguide 62. Moreover, embodiments in which light beams 81-83 have different wavelengths are subject to a third condition, namely, that, within the range of wavelengths of the light beams, the chromatic aberration of lens 64 is less than a threshold chromatic aberration.

FIG. 3B shows light beams 85, 86, 87 incident on output path 70 at progressively increasing angles of incidence relative to the optical axis of optical waveguide 62. Light beams 85, 86, 87 are incident on output path 70 at the intersection of optical axis 32 and lens 64. Light beam 85 is incident collinearly with the optical axis of optical waveguide 82, passes through lens 64 without deviation and enters optical waveguide 62. The focusing effect of lens 64 converts the non-zero angles of incidence of light beams 86, 87 to respective lateral offsets at the proximal end of optical waveguide 62. Moreover, light beams 86, 87 are incident on optical waveguide 62 at a non-zero angle of incidence. The optical waveguide outputs only those of the light beams whose angle of incidence on output path 70 is so small that the lateral offset and angle of incidence of the light beam on optical waveguide 62 is within the acceptance range of optical waveguide 62.

From FIGS. 3A and 3B, it can be seen that the acceptance range of embodiment of optical multiplexer system 10 in which output path 30 comprises a focusing lens 64 has a relatively large spatial component and a relatively small angular component. Consequently, in such an embodiment, the angular alignment of light beam 50 is substantially more critical than the positional alignment of the light beam.

Figure 4A:
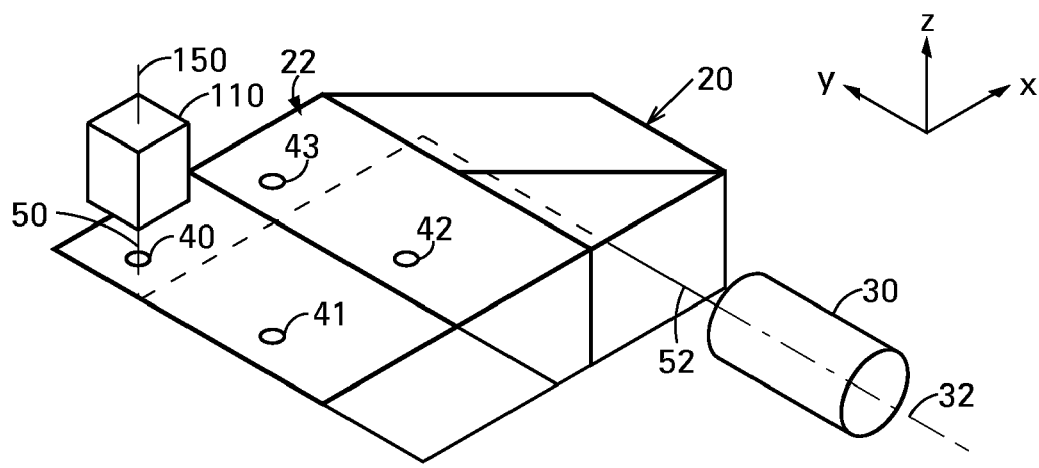
FIGS. 4A, 4B and 4C are an isometric view and two side views showing an example of an optical multiplexer system in accordance with an embodiment of the invention.
Figure 4B:
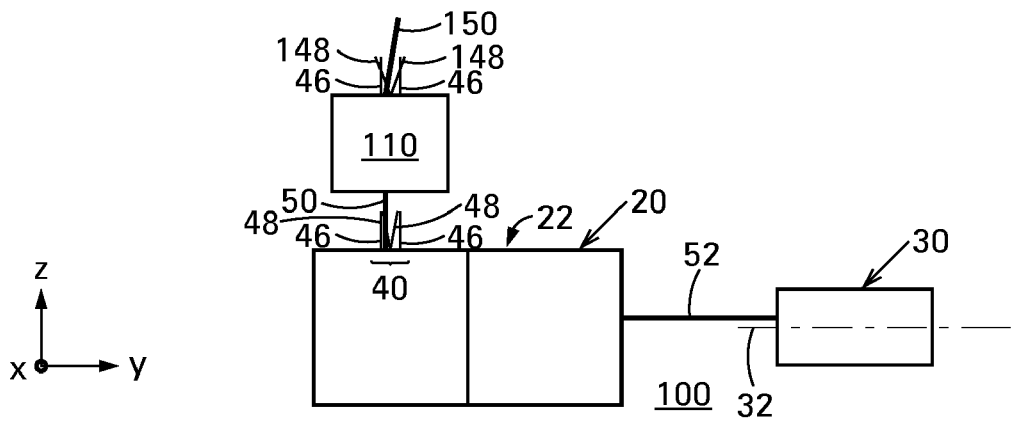
Figure 4C:
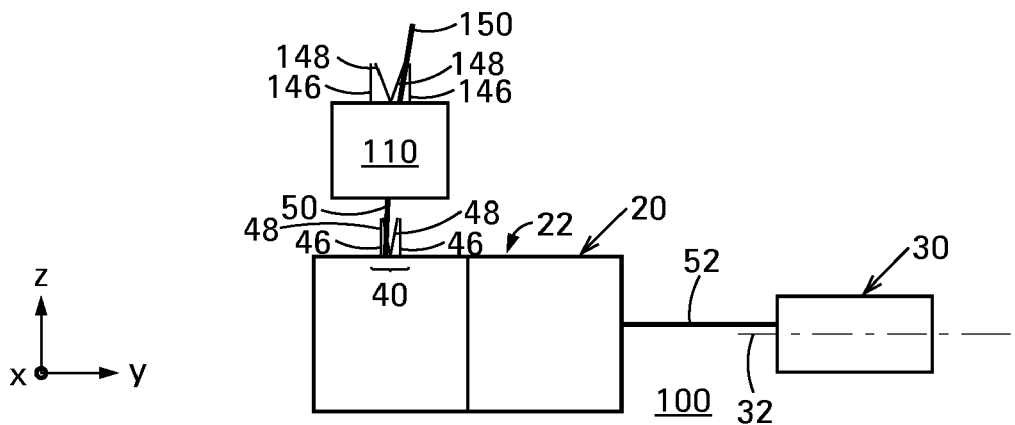

FIG. 4A is an isometric view of an example of an optical multiplexer system 100 in accordance with an embodiment of the invention. FIGS. 4B and 4C are side views illustrating examples of the operation of optical multiplexer system 100. Referring first to FIG. 4A, optical multiplexer system 100 is composed of optical multiplexer 20, output path 30 and an adjustable beam steering element 110.

As described above, optical multiplexer 20 comprises input port 40 characterized by an original acceptance range. The original acceptance range of input port 40 has a spatial component represented by lines 46 shown in FIGS. 4B, 4C, and an angular component represented by lines 48 also shown in FIGS. 4B, 4C. Output path 30 is disposed relative to optical multiplexer 20 such that light beam 50 incident on input port 40 within the original acceptance range of the input port enters the output path.

Adjustable beam steering element 110 is located adjacent input port 40, and is adjustable such that light beam 150 incident on the beam steering element 110 within an enhanced acceptance range is output by the beam steering element as light beam 50 that is incident on input port 40 within the original acceptance range of the input port 40. The enhanced acceptance range of beam steering element 110 is greater than the original acceptance range of input port 40 spatially, angularly or both spatially and angularly. Optical multiplexer 20 outputs light beam 50 received at input port 40 as output beam 52 that is incident on output path 30. Since light beam 50 output by beam steering element 110 is within the original acceptance range of input port 40, output beam 52 enters output path 30.

The greater acceptance range of beam steering element 110 compared with input port 40 obviates the need to adjust the light source or the optical waveguide system that provides light beam 150 to beam steering element 110, or greatly simplifies the process of adjusting the light source or optical waveguide system. A typical embodiment of beam steering element 110, through adjustment, has an acceptance range having a spatial component of the order of millimeters and an angular component of the order of degrees.

Operation of optical multiplexer system 100 will now be described in greater detail with reference to the side views shown in FIGS. 4B and 4C. As described above with reference to FIGS. 3A and 3B, embodiments of output path 30 that comprise a focusing lens similar to focusing lens 64 provide input port 40 with an original acceptance range having a relatively large spatial component, but a relatively small angular component. The spatial component of the original acceptance range may be sufficient such that, in some applications, the acceptance range of adjustable beam steering element 110 need only have a greater angular component than the original acceptance range. In the example shown in FIG. 4B, the spatial component of the original acceptance range is sufficiently large to allow an embodiment of beam steering element 110 that provides only angular beam steering to be used. In this example, only the angular component of the enhanced acceptance range provided by adjustable beam steering element 110 is greater than that of the original acceptance range of input port 40. In FIG. 4B, the enhanced acceptance range of beam steering element 110 has a spatial component indicated by lines 46 and an angular component indicated by lines 148. The spatial component of the enhanced acceptance range of beam steering element 110 is equal to the spatial component of the original acceptance range of input port 40, also indicated by lines 46, but the angular component of the enhanced acceptance range is substantially greater than the angular component of the original acceptance range indicated by lines 48. The components of the original and enhanced acceptance ranges are exaggerated to enable them to be shown clearly.

FIG. 4B shows light beam 150 incident on beam steering element 110 at a location of incidence and with an angle of incidence within the enhanced acceptance range of beam steering element 110. The location of incidence of light beam 150 is within the spatial component of the original acceptance range of input port 40 but the angle of incidence of light beam 150 is outside the angular component of the original acceptance range of the input port. Thus, if light beam 150 were directly incident on input port 40, output beam 52 output by optical multiplexer 20 would not enter output path 30. Beam steering element 110 outputs light beam 150 as light beam 50.

FIG. 4B shows adjustable beam steering element 110 after it has been adjusted to make light beam 50 incident on input port 40 at an angle of incidence within the angular component of the original acceptance range of the input port. The location of incidence of light beam 50 on input port 40 remains within the spatial component of the original acceptance range of the input port 40. Since light beam 50 is incident on input port 40 within the original acceptance range of the input port, beam steering element 110 enables output beam 52 output by multiplexer 20 to enter output path 30.

An embodiment of beam steering element 110 that provides spatial beam steering in addition to angular beam steering is used in embodiments of optical multiplexer system 100 in which output path 30 lacks a focusing lens, or the output path comprises a focusing lens but the spatial component of the original acceptance range is insufficient to accommodate all possible locations of incidence of light beam 150, or adjusting the portion of the beam steering element that provides angular beam steering imposes a positional offset on the light beam. With an embodiment of beam steering element 110 that provides both spatial and angular beam steering, both the angular component and the spatial component of the enhanced acceptance range of beam steering element 110 are greater than those of the original acceptance range of input port 40. In FIG. 4C, the enhanced acceptance range of beam steering element 110 has a spatial component indicated by lines 146 and an angular component indicated by lines 148. The components of the original acceptance range and the enhanced acceptance range are exaggerated to enable them to be shown clearly.

FIG. 4C shows beam steering element 110 after it has been adjusted to make light beam 50 incident on input port 40 at a location of incidence within the spatial component of the original acceptance range of the input port and at an angle of incidence within the angular component of the original acceptance range of the input port. Since light beam 50 is incident on input port 40 within the original acceptance range of the input port, beam steering element 110 enables output beam 52 output by multiplexer 20 to enter output path 30.

Light beam 150 is generated by a light source (not shown) and is output from the light source towards beam steering element 110 from a location on the light source and in a direction of propagation that are typically not accurately defined relative to the structure of the light source, as described above. Alternatively, light is generated by a light source (not shown) and is transmitted to beam steering element 110 by an optical waveguide system (not shown) typically composed of an optical waveguide with a collimator at each end. The optical waveguide system outputs the light towards beam steering element 110 as light beam 150. Light beam 150 is output from a location on the optical waveguide system and in a direction of propagation that are typically not accurately defined relative to the structure of the optical waveguide system, also as described above. However, provided that light beam 150 is incident on beam steering element 110 at a location of incidence and at an angle of incidence within the spatial component and the angular component, respectively, of the enhanced acceptance range of the beam steering element, beam steering element 110 can be adjusted to make light beam 50 incident on input port 40 within the original acceptance range of the input port. With beam steering element 110 so adjusted, output beam 52 output by optical multiplexer 20 enters output path 30 without the need to adjust the position and orientation of the light source or the optical waveguide system.

The example of optical multiplexer system 100 shown in FIG. 4A is simplified in that only a single beam steering element 110 is shown. A more typical example of optical multiplexer system 100 would have a respective adjustable beam steering element similar to beam steering element 110 located between each of the input ports 40-43 of optical multiplexer 20 and a respective light source or optical waveguide system (not shown). Each beam steering element is adjusted such that the light beam output by the beam steering element is incident on the respective input port within the original acceptance range of the input port. With the beam steering elements so adjusted, optical multiplexer 20 outputs the light beams incident on all of the beam steering elements into output path 30.

Figure 5A:
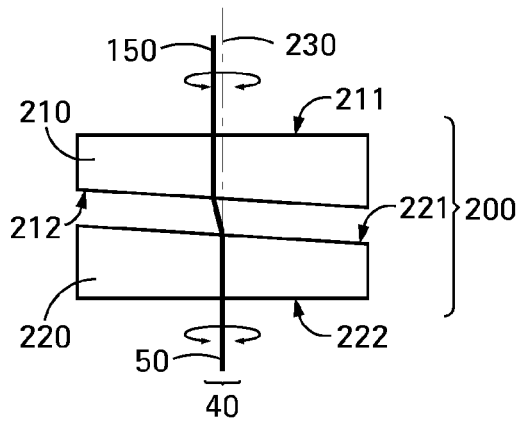
FIGS. 5A and 5B are schematic diagrams showing an example of a refraction-based angular beam manipulator.
Figure 5B:
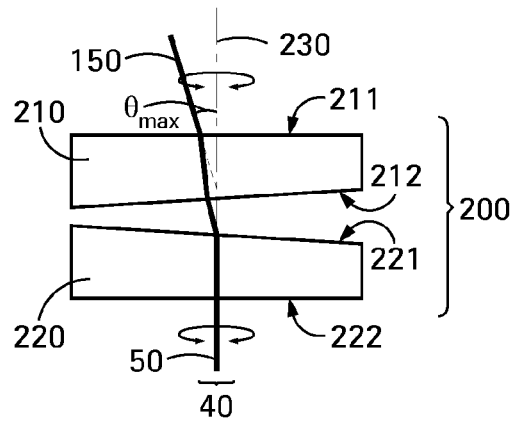

A beam steering element that is adjustable to change at least the direction of propagation of a light beam may be used as adjustable beam steering element 110. Angular beam manipulators that can be adjusted to change the direction of propagation of a light beam are known in the art and can be used as at least part of adjustable beam steering element 110. FIGS. 5A and 5B are schematic diagrams showing an example 200 of a refraction-based angular beam manipulator that can be adjusted to change the direction of propagation of a light beam and that may be used as at least part of adjustable beam steering element 110.

FIGS. 5A and 5B show angular beam manipulator 200 composed of two matched transparent wedges 210, 220 disposed opposite one another. Wedges 210, 220 are mounted so that each is capable of rotation about a common axis 230. Each wedge 210, 220 has one major surface 211, 222 disposed orthogonally to axis 230 and another, sloped major surface 212, 221 opposite non-sloped major surface 211, 222. In the example shown, the sloped surfaces 212, 221 of wedges 210, 220 face one another. In other examples, the non-sloped surfaces 211, 222 of wedges 210, 220 are juxtaposed, or the non-sloped surface 211, 222 of one of the wedges 210, 220 is juxtaposed with the sloped surface 221, 212 of the other of wedges 220, 210. When illuminated with light beam 150 within its enhanced acceptance range, angular beam manipulator 200 can be adjusted to output light beam 50 in a direction that is typically parallel to axis 230.

In angular beam splitter 200, light beam 150 is incident on wedge 210 and is refracted in accordance with Snell's Law at each of the surfaces 211, 212, 221 and 222 of wedges 210 and 220. With wedges 210 and 220 configured as shown in FIG. 5A, consecutive surfaces 212, 221 are disposed parallel to each other, and the angular deflection of beam 150 at surface 221 is equal and opposite to the angular deflection of beam 150 at surface 212. Similarly, surfaces 211, 222 are parallel to each other, and since surfaces 212, 221 cause no net angular deflection, the angular deflection of beam 150 at surface 222 is equal and opposite to the angular deflection at surface 211. Accordingly, in the configuration shown in FIG. 5A, light beam 50 output by beam manipulator 200 has no net angular deflection with respect to light beam 150, and the angle of incidence of light beam 50 on input port 40 is equal to the angle of incidence of light beam 150 on beam manipulator 200.

Wedges 210 and 220 are rotatable with respect to each other about axis 230. Such rotation changes the angle between surfaces 212 and 221. FIG. 5B illustrates a configuration of angular beam manipulator 200 in which wedge 220 has been rotated about axis 230 until the angle between surfaces 212 and 221 is a maximum. In the configuration shown in FIG. 5B, the refractions at surfaces 212, 221, and 222 deflect light beam 150 in the same direction to impose a maximum angular deflection $\theta_{max}$ on light beam 150. With wedge 220 adjusted relative to wedge 210 as just described, light beam 150 incident on beam manipulator 200 with an angle of incidence equal to $\pm\theta_{max}$ will be output by the angular beam manipulator as light beam 50 having an angle of incidence of zero on input port 40. Such an angle of incidence is within the angular component of the acceptance range of input port 40, and optical multiplexer 20 will direct output beam 52 into output path 30. Moreover, since the angular component of the acceptance range of input port 40 is greater than zero, the angular component of the enhanced acceptance range of an embodiment of beam steering element 110 incorporating angular beam manipulator 200 is approximately equal to plus or minus the sum of $\theta_{max}$ and the angular component of the acceptance range of input port 40.

Smaller rotations of wedge 220 relative to wedge 210 produce smaller angular deflections of light beam 50 relative to light beam 150, so that angular beam manipulator 200 can impose any desired angular deflection on light beam 150 between 0 and $\pm\theta_{max}$. Angular beam manipulator 200 can therefore receive light beam 150 with any angle of incidence in the range 0 and $\pm\theta_{max}$ and direct light beam 50 towards port 40 such that light beam 50 is incident on the port at an angle of incidence within the angular component of the original acceptance range of the input port. Rotating one of wedges 210 and 220 relative to the other about axis 230 sets the polar angular deflection that beam manipulator 200 imparts on light beam 150. Moreover, rotating wedges 210 and 220 about axis 230 in concert, i.e., without relative rotation between the wedges, sets the azimuthal angle at which beam manipulator 200 provides its polar deflection. Thus, when appropriately adjusted, beam manipulator can receive light beam 150 with an angle of incidence having any azimuthal component and having a polar component less than $\pm\theta_{max}$ and will direct light beam 50 towards input port 40 such that light beam 50 is incident on the input port at an angle of incidence within the angular component of the acceptance range of the input port.

Typically, wedges 210 and 220 are mounted in respective mounts (not shown) that in turn are mounted in an armature (not shown) that locates the wedges relative to input port 40. The armature additionally allows the wedges to be rotated in concert and allows the wedges to be rotated relative to one another. The wedges may be rotated by hand, typically using a suitable tool, or by a suitable drive mechanism (not shown).

Figure 6A:
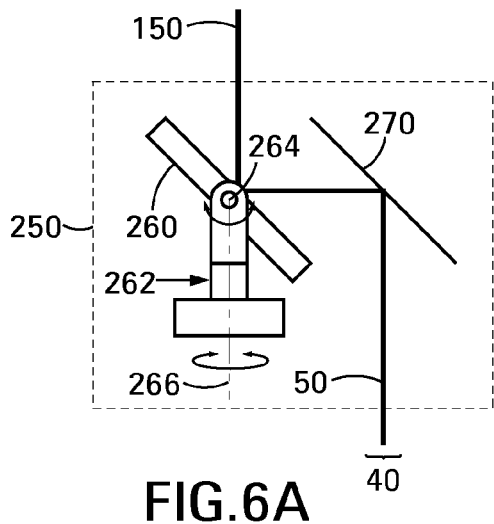
FIGS. 6A and 6B are schematic diagrams showing an example of a reflection-based angular beam manipulator.
Figure 6B:
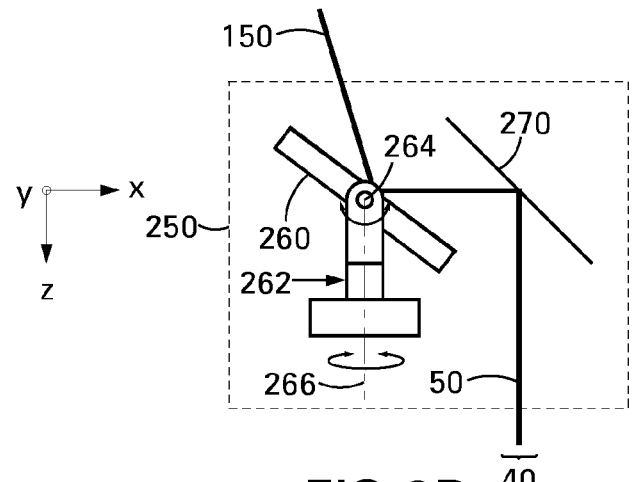

FIGS. 6A and 6B show an example 250 of a reflection-based angular beam manipulator that is adjustable to change the direction of propagation of a light beam and that may be used as at least part of adjustable beam steering element 110. Angular beam manipulator 250 is composed of a reflector 260 and a reflector 270 configured in a periscope arrangement with their reflective surfaces facing one another. Angular beam manipulator 250 includes reflector 270 to allow light beam 150 to be incident on the angular beam manipulator in a direction substantially parallel to the direction in which light beam 50 is incident on input port 40. In embodiments in which light beam 150 need not be incident on angular beam manipulator 250 in a direction substantially parallel to the direction in which light beam 50 output by the angular beam manipulator is incident on input port 40, reflector 270 may be omitted. Reflector 260 is mounted on gimbals 262 having two axes of rotation 264, 266. Axes 264, 266 are typically mutually orthogonal. In some embodiments, reflector 270 is statically mounted adjacent port 40. In other embodiments, reflector 270 is mounted on gimbals (not shown) having two orthogonal axes of rotation. Reflector 260 is located to receive light beam 150 at its reflective surface and is oriented to direct the reflected light beam towards reflector 270. Reflector 270 is located to receive the reflected light beam at its reflective surface and is oriented to direct the reflected light beam towards input port 40 as light beam 50 such that light beam 50 is incident on the input port within the acceptance range of the input port.

FIG. 6A shows angular beam manipulator 250 adjusted to impart no net angular deflection between light beam 150 and light beam 50. Consequently, the angle of incidence of light beam 50 on input port 40 is equal to the angle of incidence of light beam 150 on beam manipulator 250. No net angular deflection between light beam 150 and light beam 50 is obtained when reflector 260 and reflector 270 are adjusted so that the planes of their reflective surfaces are parallel to one another. The orientation of the reflectors may be adjusted by hand, typically using a suitable tool, or by a suitable drive mechanism (not shown). Provided that the angle of incidence of light beam 150 on angular beam manipulator 250 is within the angular component of the acceptance range of input port 40, multiplexer 20 will direct output beam 52 into output path 30 with angular beam manipulator 250 adjusted this way.

FIG. 6B shows angular beam manipulator 250 adjusted to impart a net angular deflection on light beam 50 with respect to light beam 150. Such adjustment allows light beam 150 incident on beam manipulator 250 at an angle of incidence outside the angular component of the acceptance range of input port 40 to be output into output path 30. A net angular deflection between light beam 150 and light beam 50 is obtained by adjusting either or both of reflector 260 and reflector 270 so that their planes are not parallel to one another. In the example shown, the orientation of reflector 260 about axis 264 has been adjusted so that the plane of reflector 260 is no longer parallel to that of reflector 270. With this orientation of reflector 260, beam manipulator 250 imposes a net angular deflection on light beam 150 such that the angle of incidence of light beam 50 on port 40 is within the angular component of the acceptance range of port 40. Consequently, multiplexer 20 will direct output beam 52 into output path 30 despite the angle of incidence of light beam 150 on beam manipulator 250 being outside than the angular component of the acceptance range of the input port.

In the example shown, light beam 150 is incident on beam manipulator 250 in a direction of incidence parallel to the x-z plane shown in FIGS. 6A, 6B and at an acute angle to the z direction. In this example reflector 260 rotates about the axis 264 parallel to the y-axis to direct light beam 50 towards input port 40 at an angle of incidence within the angular component of the acceptance range of the input port. In an example in which light beam 150 is incident on beam manipulator 250 in a direction not parallel to the x-z plane, reflector 260 is additionally rotated about axis 266 parallel to the z-axis to direct light beam 50 towards input port 40 at an angle of incidence within the angular component of the acceptance range of the port.

In some embodiments, light beam 50 output by an angular beam manipulator such as angular beam manipulator 200 or angular beam manipulator 250 is incident on input port 40 at a location of incidence outside the spatial component of the acceptance range of the input port. The spatial offset of the location of incidence may be a result of one or more of the following causes: misalignment of the source of light beam 150, a spatial offset introduced by the above-mentioned angular beam manipulator, and/or another cause of spatial offset. In such embodiments, adjustable beam steering element 110 is additionally composed of a beam translator that adjustably introduces a lateral offset into the path of light beam 150.

Figure 7:
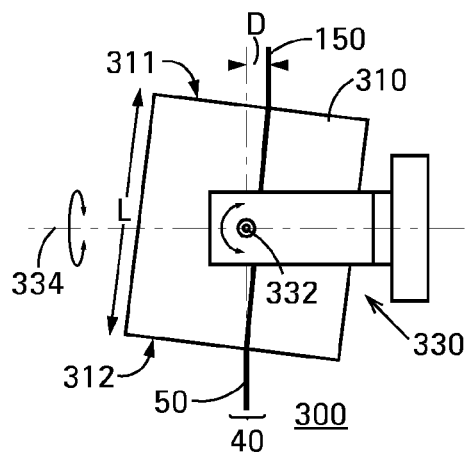
FIG. 7 is a schematic diagram showing an example of a beam translator.

FIG. 7 is a schematic diagram showing an example of a beam translator 300 that may be used as part of adjustable beam steering element 110. Beam translator 300 is composed of an optical plate 310 having two plane surfaces 311 and 312. Surfaces 311 and 312 are disposed parallel to one another, so that refraction at surface 312 deflects light beam 150 by an angle that is equal and opposite to the deflection caused by refraction at surface 311. Accordingly, beam translator 300 outputs light beam 50 in a direction of propagation that is the same as that of light beam 150. However, unless light beam 150 has a zero angle of incidence on surface 311, beam translator 300 will output light beam 50 spatially offset from light beam 150 by a displacement D in a direction orthogonal to the direction of propagation of light beam 150. Displacement D depends on the dimension L of plate 310 in the direction in which light beam 150 propagates through it, the index of refraction of the material of plate 310, and the angle of incidence of light beam 150 on surface 311.

Plate 310 is mounted on gimbals 330 that allow plate 310 to be rotated in pitch and yaw about nominally orthogonal axes 332 and 334. Adjusting the pitch and yaw of plate 310 effectively adjusts the magnitude and direction of the displacement D of light beam 50 relative to light beam 150. The pitch and yaw of plate 310 are adjusted such that an example of light beam 150 that, absent beam translator 300, would be incident on input port 40 outside the spatial component of the acceptance range of the input port is incident on input port 40 within the spatial component of the acceptance range. Other beam translator configurations are known and may be used. The pitch and yaw of plate 310 may be adjusted by hand, typically using a suitable tool, or by a suitable drive mechanism (not shown).

An example of beam steering element 110 providing both angular beam steering and spatial beam steering is composed of an angular beam manipulator and a beam translator in tandem. An angular beam manipulator such as angular beam manipulator 200, angular beam manipulator 250 or another angular beam manipulator is arranged in tandem with a beam translator such as beam translator 300 or another beam translator. Generally, the order of the angular beam manipulator and the beam translator does not matter. However, in some applications, one order may produce better results than the other. An example of a tool-assisted, manually-adjusted embodiment of a beam steering element composed of an angular beam manipulator and a beam translator in tandem is described by Prince et al. in U.S. Pat. No. 7,035,025, assigned to the assignee of this disclosure and incorporated by reference.

In one method of adjusting beam steering element 110, the beam steering element is illuminated with light beam 150 and the output of output path 30 is monitored. Beam steering element 110 is then adjusted until light beam 150 is detected at the output of output path 30. The adjustment involves adjusting at least two elements, e.g., wedges 210 and 220 of the angular beam manipulator 200 of the beam steering element. In embodiments in which beam steering element 110 is additionally composed of a beam translator such as beam translator 300, two additional adjustments are required, i.e., the pitch and yaw of plate 310. The process just described is performed for the beam steering element adjacent each input port of optical multiplexer 20.

As noted above, beam steering element 110 can be adjusted manually to direct light beam 150 into output path 30. However, the process of adjusting beam steering element 110 is made substantially easier if it is automated. For example, a motorized embodiment of beam steering element 110 can be set to perform an automatic search operation in which the adjustable elements of the beam steering element perform a search routine while the output path 30 is monitored. When a flash of light is detected in the output path, the search routine is stopped and then run slowly in reverse until light is once more detected in the output path. Optionally, an additional slow pass is performed to maximize the intensity of the light in the output path.

The adjustment process is made faster and easier than that just described by measuring one or both of the location of incidence and the angle of incidence of output beam 52 on output path 30. Adjustable beam steering element 110 is then adjusted in response to this measurement or these measurements. This allows beam steering element 110 to be adjusted in a manner that reduces the angle of incidence on output path 30 to one that lies within the angular component of the acceptance range of the output path and that reduces the offset between the location of incidence of output beam 52 and the optical axis 32 of output path 30 to one that is within the spatial component of the acceptance range of the output port. In embodiments that measure one or both of the location of incidence and the angle of incidence, adjustable beam steering element 110 can be operated within a negative feedback loop. Some of the automated embodiments to be described below allow the beam steering element to be adjusted automatically both when the beam steering element is first set up and when the beam-steering element is re-adjusted in the event, e.g., of a light source replacement. The remainder of the automated embodiments require that the beam steering element initially be subject to an external adjustment process, but automatically re-adjusts the beam steering element in the event, e.g., of a light source replacement.

Figure 8A:
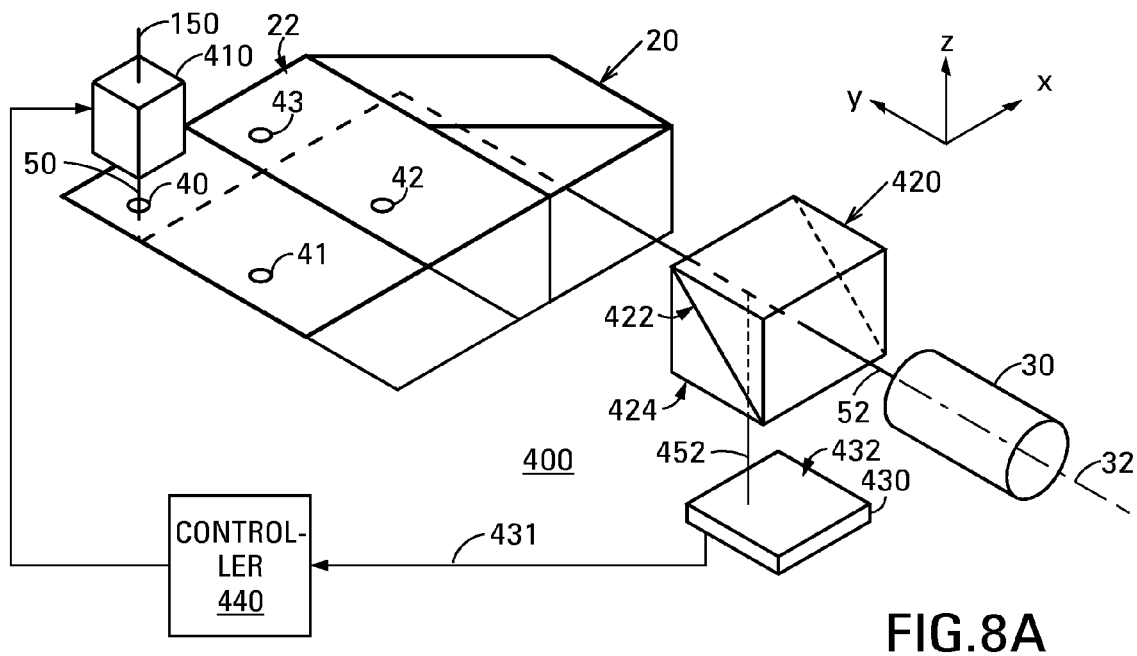
FIG. 8A is a partially-exploded isometric view showing an example of an optical multiplexer system in accordance with another embodiment of the invention.

FIG. 8A is a partially-exploded isometric view showing an example of an optical multiplexer system 400 in accordance with another embodiment of the invention. Optical multiplexer system 400 is suitable for use in applications in which light beam 150 can be incident on the beam steering element at a location of incidence outside the spatial component of the acceptance range of input port 40 but is incident at an angle of incidence within the angular component of the acceptance range of the input port. In optical multiplexer system 400, the beam steering element is composed of only a beam translator. The beam steering element steers light beam 150 to change only the location of incidence of light beam 50 on input port 40.

Optical multiplexer system 400 is composed of optical multiplexer 20, output path 30, a motorized beam steering element adjacent each input port of optical multiplexer 20, a beam splitter 420, a position sensor 430, and a controller 440. To simplify the drawing, only motorized beam steering element 410 adjacent input port 40 is shown. Output path 30 is disposed relative to optical multiplexer 20 such that light beam 50 incident on input port 40 within the original acceptance range of the input port enters the output path. Motorized beam steering element 410 is located adjacent input port 40, and is adjustable to steer light beam 150 incident on the beam steering element within an enhanced acceptance range such that light beam 50 output towards input port 40 is incident on the input port within the original acceptance range of the input port. Consequently, after passing through multiplexer 20, light beam 50 enters output path 30 as output beam 52. In this embodiment, the enhanced acceptance range has a spatial component greater than the spatial component of the original acceptance range.

Figure 8B:
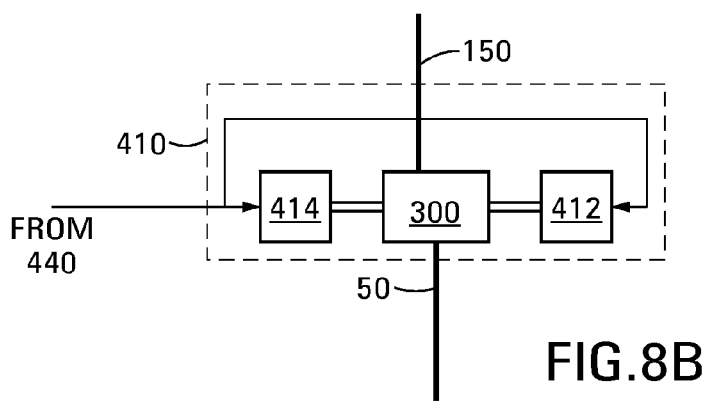
FIG. 8B is a schematic diagram showing an example of a motorized beam steering element that may constitute part of the optical multiplexer system shown in FIG. 8A.

FIG. 8B is a schematic diagram showing an example of motorized beam steering element 410. Motorized beam steering element 410 shown is composed of a beam translator and a respective motor coupled to move each of the adjustable components of the beam translator. In the example shown, motorized beam steering element 410 is composed of beam translator 300, described above with reference to FIG. 7, and motors 412, 414 coupled by a suitable transmission (not shown) to rotate the plate 310 (not shown) of beam translator 300 in pitch and in yaw, respectively. Another type of motor-actuated beam translator may be used instead of beam translator 300 and motors 412, 414. Motors 412, 414 are electrically connected to an output of controller 440 whence the motors receive respective motor control signals. The construction of motorized beam steering element 410 may differ from that described.

The partially-exploded view of FIG. 8A shows beam splitter 420 separated from optical multiplexer 20 to enable the beam splitter and optical multiplexer to be depicted more clearly. Typically, beam splitter 420 is affixed to optical multiplexer 20. Alternatively, beam splitter 420 and optical multiplexer 20 collectively form a single monolith. Beam splitter 420 is composed of a beam-splitting surface 422 that derives a small sample of output beam 52 output by multiplexer 20 as a beam sample 452. Beam splitter directs beam sample 452 towards position sensor 430 in a direction nominally orthogonal to output beam 52 so that the positional relationship between output beam 52 relative to output path 30 and beam sample 452 relative to position sensor 430 is precisely known. Beam splitting surface 422 is not wavelength selective over the range of wavelengths constituting output beam 52.

Position sensor 430 has a light-sensitive surface 432 on which beam sample 452 output by beam splitter 420 is incident at a location that depends on the location of incidence of output beam 52 on output path 30. In an embodiment, position sensor 430 is affixed to the surface 424 of beam splitter 420 with light sensitive surface 432 in contact with surface 424. Surface 424 is the surface of beam-splitter 420 parallel to the major surface 22 of optical multiplexer 20. In response to beam sample 452 incident on light-sensitive surface 432, position sensor 430 generates an electrical signal 431 and outputs the electrical signal to controller 440. Electrical signal 431 has a measurable property that depends on the position at which beam sample 452 is incident on light-sensitive surface 432. By analyzing electrical signal 431, circuitry within controller 440 can determine the position at which beam sample 452 is incident on light-sensitive surface 432.

Figure 8C:
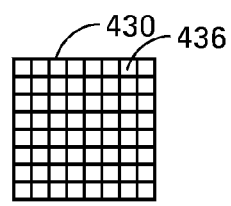
FIGS. 8C and 8D are schematic diagrams showing examples of two different types of position sensor that may constitute part of the optical multiplexer system shown in FIG. 8A.

FIG. 8C is a schematic diagram showing an example of a pixellated sensor that can be used as position sensor 430. The pixellated sensor is composed of a two-dimensional array of sensor elements. An exemplary sensor element is shown at 436. Reference numeral 436 will additionally be used to refer to the sensor elements of a pixellated sensor collectively. Each of sensor elements 436 generates a respective sensor element signal, which is an electrical signal. position sensor 430 is additionally composed of circuitry (not shown) for multiplexing and, optionally, digitizing the sensor element signals generated by sensor elements 436 to form electrical signal 431. Electrical signal 431 is repetitively refreshed to enable electrical signal 431 to represent the current location of incidence of beam sample 452 on light-sensitive surface 432 as the location of incidence changes during adjustment of beam steering element 410.

Figure 8D:
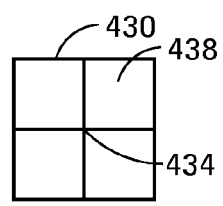

FIG. 8D is a schematic diagram showing an example of a quadrant sensor that can be used as position sensor 430. The quadrant sensor is composed of four sensor elements that are typically substantially larger than the sensor elements of a typical pixellated position sensor. An exemplary sensor element is shown at 438. Reference numeral 438 will additionally be used to refer to the sensor elements of a quadrant sensor collectively. Each of sensor elements 438 generates a respective sensor element signal, which is an electrical signal. In some embodiments, the sensor element signals are output to controller 440 by respective electrical conductors (not shown) as electrical signal 431. Other embodiments are additionally composed of circuitry (not shown) that multiplexes and optionally digitizes the sensor element signals to form electrical signal 431. A point at which all four sensor elements 438 are juxtaposed constitutes a reference point 434. When reference point 434 is illuminated, the respective sensor element signals output by all four of sensor elements 438 are nominally equal in amplitude. Other configurations of position sensor 430 are possible and may be used.

Position sensor 430 is positioned in the x-y plane such that a defined position on light-sensitive surface 432 has a known positional relationship to the location in the x-z plane of the optical axis 32 of output path 30. The position in the x-y plane of a quadrant sensor used as position sensor 430 is adjusted such that, when output beam 52 is aligned with optical axis 32, beam sample 452 is incident on reference point 434. A process for adjusting the position a quadrant sensor will be described below with reference to FIG. 8E. The position in the x-y plane of a pixellated sensor used as position sensor 430 typically does not need to be adjusted. Instead, the positional relationship is established by identifying the sensor element or group of sensor elements on which beam sample 452 is incident when output beam 52 is aligned with optical axis 32.

Figure 8E:
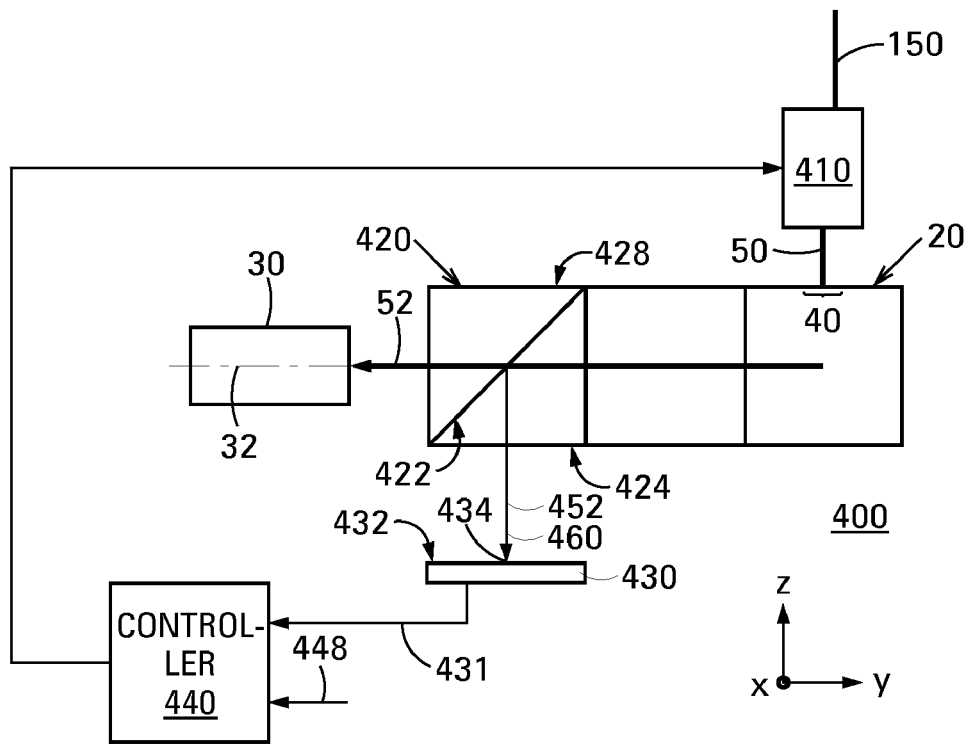
FIGS. 8E and 8F are side views illustrating the initial alignment and operation of the optical multiplexer system shown in FIG. 8A.

After optical multiplexer system 400 has been assembled, what will be referred to as an initial alignment process is performed to determine the above-described positional relationship between the optical axis 32 of output path 30 and a position on position sensor 430. FIG. 8E is a side view showing optical multiplexer system 400 during the initial alignment process. Each beam steering element is adjusted to align the location of incidence of output beam 52 with the optical axis 32 of output path 30 so that the output beam enters the output path. The initial adjustment of each beam steering element is typically performed in the factory.

Once output beam 52 has been aligned with optical axis 32 so that the output beam enters the output path, circuitry within controller 440 generates what will be referred to as a reference signal from electrical signal 431 generated by position sensor 430. The reference signal is an electrical signal that is stored within the controller and represents the position of the optical axis 32 of output path 30 as the controller adjusts adjustable beam steering element 410. Once the initial alignment process has been performed, the controller can then be operated in response to the reference signal and the electrical signal generated by the position sensor to re-adjust the beam steering element in a manner that restores the output beam to the alignment to which it was set by the initial alignment process. In the re-adjustment process, the beam steering element is adjusted to move the output beam such that the position of incidence of the beam sample on the position sensor is moved towards the reference position represented by the reference signal. Such readjustment of the beam steering element would be performed, e.g., in the event that the source of light beam 150 is changed or modified, or as part of a routine maintenance program.

FIG. 8E shows optical multiplexer system 400 during an exemplary initial alignment process in which the reference signal is generated and, in embodiments employing a quadrant sensor as position sensor 430, the position in the x-y plane of position sensor 430 is additionally adjusted to establish the above-described positional relationship. During the initial alignment process, controller 440 is set to an initial alignment mode in which the controller operates in response to an external control signal 448. Controller 440 operates in response to control signal 448 to control beam steering element 410 and, hence, the location of incidence of light beam 50 on input port 40. Beam steering element 410 is illuminated with light beam 150 and outputs light beam 50 towards input port 40. Light beam 50 passes through optical multiplexer 20 and is incident on output path 30 as output beam 52. Initially, output beam 52 is typically not aligned with the optical axis 32 of output path 30, and may even be so far off-axis that it does not enter the output path. Additionally, beam splitter 420 derives beam sample 452 from output beam 52 and directs the beam sample towards position sensor 430, as described above. During the initial alignment process, beam sample 452 derived from output beam 52 will be referred to as reference beam 460.

In the initial alignment process, the location of incidence of output beam 52 on output path 30 is determined using a technique that does not use the electrical signal 431 generated by position sensor 430. Since the initial alignment process is typically performed in the factory where optical multiplexer system 400 is assembled and tested, ways of determining the location of incidence other than by using position sensor 430 are available and are used in the initial alignment process. In one example, the intensity of output beam 52 at the output of output path 30 is monitored as controller 440 operates in response to control signal 448 to command beam steering element 410 to change the location of incidence of light beam 50 on input port 40.

Some embodiments of the initial alignment process use a more critical alignment criterion than simply changing the location of incidence of the output beam on the output path such that the output beam enters the output path. Such embodiments of the initial alignment process adjust beam steering element 410 to align the output beam with the optical axis 32 of the output path. This centers the location of incidence within the spatial component of the acceptance range, which maximizes the angular component of the acceptance range and provides an optimally-located position for the re-adjustment process.

In an example, the location of optical axis 32 is determined by control signal 448 causing controller 440 to command beam steering element 410 to steer light beam 50 and, hence, output beam 52, in a pattern that searches for the boundary of the spatial component of the acceptance range of output path 30. The intensity the output beam measured at the output of the output path falling below a threshold intensity indicates that the output beam has crossed the boundary of the spatial component of the acceptance range and is no longer entering the output path. Once controller 440 has determined the boundary of the spatial component of the acceptance range, the controller calculates the center of the spatial component of the acceptance range from its measurements of the boundary of the spatial component. The center of the spatial component of the acceptance range provides a reasonable approximation of the location of the optical axis 32 of output path 30. Controller 440 then commands beam steering element 410 to steer output beam 52 to the center of the spatial component of the acceptance range. With output beam 52 aligned such that the output beam enters output path 30 and, in some embodiments, with output beam 52 aligned with optical axis 32 as just described, reference beam 460 is incident on position sensor 430 at what will be referred to herein as a reference position. With reference beam 460 incident at the reference position on position sensor 430, the position in the x-y plane of a quadrant sensor used as position sensor 430 is aligned if necessary, and the reference signal that represents the reference position is generated.

The position in the x-y plane of a quadrant sensor used as position sensor 430 is aligned as follows. Position monitoring circuitry within controller 440 monitors electrical signal 431 output by position sensor 430. With beam steering element 410 adjusted as described above, position sensor 430 is moved in the x-y plane until the position monitoring circuitry determines that the sensor element signals generated by all four sensor elements 438 have respective amplitudes greater than a threshold amplitude, indicating that reference beam 460 is incident on parts of all four sensor elements. Optionally, during the initial alignment process, the position monitoring circuitry within controller 440 outputs indications of the direction in which position sensor 430 should be moved to align the reference point 434 on position sensor 430 with reference beam 460. Once reference point 434 is aligned with reference beam 460, position sensor 430 is fixed in position and, with reference beam 460 continuing to be incident on light-sensitive surface 432, circuitry within controller 440 stores the relative amplitudes of the sensor element signals constituting electrical signal 431 to provide the reference signal.

A pixellated sensor used as position sensor 430 is typically mounted at a fixed location in the x-y plane such that reference beam 460 is incident approximately at the center of light-sensitive surface 432. In embodiments in which sensor elements 436 (FIG. 8C) are comparable in size to the diameter of the reference beam, or are larger, reference accuracy is improved by locating position sensor 430 such that reference beam 460 is incident on parts of at least four sensor elements. With beam steering element 410 adjusted as described above and reference beam 460 incident on light sensitive surface 432 as described above, circuitry within controller 440 stores the relative amplitudes of the sensor element signals constituting electrical signal 431 to provide the above-described reference signal. In embodiments in which position sensor 430 has many sensor elements, circuitry within controller 440 may subject electrical signal 431 to zigzag scanning and run-length coding to reduce the resources needed to store the reference signal.

The beam steering elements (not shown) adjacent the remaining input ports 41-43 are sequentially illuminated with a respective light beam and, in response to control signal 448, controller 440 additionally adjusts each beam steering element to align a respective output beam with optical axis 32 and to generate a respective reference signal.

Once the reference signal for each beam steering element has been stored within controller 440 or elsewhere, control signal 448 is discontinued and controller 440 is set to its service mode in which it maintains the adjustment to which each beam steering element, including beam steering element 410, was set during the initial alignment process. Alternatively, the beam steering elements may maintain their respective adjustments passively, without input from controller 440. With beam steering element 410 so adjusted, for example, the beam steering element translates light beam 150 incident thereon to move the location of incidence of light beam 50 on input port 40 to within the spatial component of the acceptance range of the input port. With light beam 50 so aligned, output beam 52 is incident on output path 30 at a location of incidence within the spatial component of the acceptance range of the output path. Similar remarks apply to the beam steering elements (not shown) adjacent the remaining input ports.

Controller 440 remains in its service mode until re-adjustment of one or more of the beam steering elements is necessary. For example, re-adjustment of a beam steering element is necessary when the source of the light beam incident on the beam steering element is repaired or replaced. Alternatively, the beam steering elements can be periodically re-adjusted as part of a routine maintenance program. To re-adjust one or more of the beam steering elements, controller 440 is set to its adjustment mode. An example in which controller 440 adjusts beam steering element 410 will now be described. Adjustment of the other beam steering elements is similar.

Figure 8F:
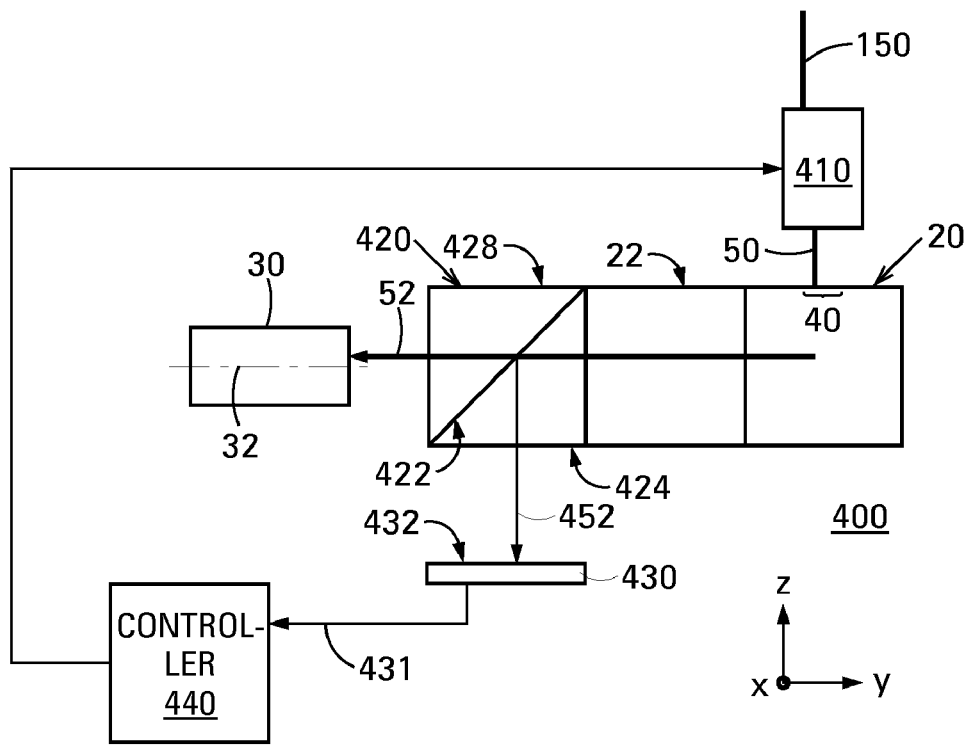

FIG. 8F shows optical multiplexer system 400 with controller 440 operating in its adjustment mode to re-adjust beam steering element 410. In an example in which a pixellated sensor used as position sensor 430, the position monitoring circuitry within the controller analyzes electrical signal 431 received from position sensor 430 to determine the current position at which beam sample 452 is incident on light-sensitive surface 432. The current position at which beam sample 452 is incident on light-sensitive surface 432 represents the current location of incidence of output beam 52 on output path 30.

The position monitoring circuitry within controller 440 calculates an offset vector that represents the magnitude and direction of the offset between the current position at which beam sample 452 is incident on light-sensitive surface 432 and the position at which reference beam 460 was incident on the light-sensitive surface during the initial alignment process. The position at which reference beam 460 was incident on light sensitive surface 432 is represented by the stored reference signal. Motor control circuitry within controller 440 operates in response to the offset vector determined by the position monitoring circuitry to provide motor control signals to motors 412, 414 within beam steering element 410. The motor control signals cause motors 412, 414 to adjust motorized beam steering element 410 in a manner that reduces the magnitude of the offset.

In one example of controller 440, the motor control circuitry executes an algorithm in response to the offset vector to generate the two or more motor control signals that, when applied to motors 412, 414, cause motors 412, 414 to adjust motorized beam steering element 410 in a manner that reduces the magnitude of the offset represented by the offset vector. In another example, for each of a number of possible offset vectors, a respective definition of two or more motor control signals is computed in advance. Each definition is a definition of respective motor control signals that, when applied to motors 412, 414, would cause the motors to adjust the motorized beam steering element in a manner that reduces the magnitude of the offset represented by respective offset vector. The motor control signal definitions are typically stored in a table linked to their respective offset vectors. The motor control circuitry receives the offset vector from the monitoring circuitry, and uses the table and the offset vector to determine the appropriate motor control signal definition and, in response to a motor control signal definition, generates one or more motor control signals that it outputs to beam steering element 410. When applied to beam steering element 410, the motor control signals cause beam steering element 410 to steer light beam 150 in manner that reduces the magnitude of the offset represented by the offset vector.

As the optical elements of beam steering element 410 move in response to motors 412, 414, the above-mentioned position monitoring circuitry within controller 440 continues to analyze electrical signal 431 received from position sensor 430 to determine the current position at which beam sample 452 is incident on light-sensitive surface 432 and a respective offset vector between the current position and the reference position represented by the reference signal. If necessary, the motor control circuitry makes appropriate changes to the motor control signals in response to the updated offset vector. The adjustment process continues until the magnitude of the offset vector generated by the position monitoring circuitry is reduced below a defined threshold. Typically, the position monitoring circuitry indicates that the magnitude of the offset vector has been reduced below the defined threshold and stops the adjustment process when it determines that the sensor element signals constituting electrical signal 431 have relative amplitudes that differ from those of the reference signal stored in controller 440 by less than a defined difference. An offset vector magnitude less than the defined threshold corresponds to the location of incidence of output beam 52 on output path 30 being within the spatial component of the acceptance range of the output path, and light beam 50 having a location of incidence on input port 40 within the spatial component of the acceptance range of the input port.

In an example in which a quadrant sensor is used as position sensor 430, the position monitoring circuitry within controller 440 initially analyzes electrical signal 431 received from position sensor 430 to identify the one of sensor elements 438 (FIG. 8D) on which beam sample 452 is incident. This sensor element will be referred to as the original sensor element. In response to this determination, motor control circuitry within controller 440 outputs motor control signals to motors 412, 414. The motors cause beam steering element 410 to change the location of incidence of light beam 50 on input port 40 in a manner that moves the position at which beam sample 452 is incident on light-sensitive surface 432 towards an adjacent sensor element 438. This sensor element will be referred to as a destination sensor element. The motor control circuitry continues to provide the motor control signals to beam steering element 410 until the position monitoring circuitry detects that electrical signal 431 contains non-zero sensor element signals from the original sensor element and the destination sensor element. This indicates that beam sample 452 is now incident on both the original sensor element and the destination sensor element.

In response to the position monitoring circuitry within controller 440 detecting that electrical signal 431 contains two non-zero sensor element signals, the motor control circuitry generates motor control signals that cause beam steering element 410 to change the location of incidence of light beam 50 on input port 40 in a manner that moves the position at which beam sample 452 is incident on light-sensitive surface 432 towards the reference point 434 of position sensor 430 along a path that maintains the incidence of the beam sample on the original sensor element and the destination sensor element. The motor control circuitry may employ a table or some other method to determine the appropriate motor control signals. The motor control circuitry continues to provide appropriate motor control signals to beam steering element 410 until the position monitoring circuitry detects that electrical signal 431 contains respective non-zero sensor element signals from all four sensor elements 438. This indicates that beam sample 452 is now incident on the reference point 434 of position sensor 430.

In response to the position monitoring circuitry within controller 440 detecting that electrical signal 431 contains respective non-zero sensor element signals from all four sensor elements 438, the motor control circuitry generates motor control signals that cause beam steering element 410 to make small changes to the location of incidence of light beam 50 on input port 40. These small changes make corresponding small changes in the position at which beam sample 452 is incident on light-sensitive surface 432 until the beam sample is centered on reference point 434 within a defined tolerance. Typically, the position monitoring circuitry indicates that beam sample 452 is centered on reference point 434 within the desired tolerance and stops the adjustment process when it determines that the sensor element signals constituting electrical signal 431 have relative amplitudes that differ from those of the reference signal stored in controller 440 by less than a defined threshold. A difference less than the defined threshold corresponds to output beam 52 having a location of incidence on output path 30 within the spatial component of the acceptance range of the output path, and light beam 50 having a location of incidence on input port 40 within the spatial component of the acceptance range of the input port. If necessary, the beam steering elements (not shown) adjacent the remaining input ports 41-43 are re-adjusted using a readjustment process similar to that just described. Once the readjustment process has been completed, controller 440 is set to its service mode in which it maintains the adjustment to which each beam steering element, including beam steering element 410, was set during the readjustment process. Alternatively, the beam steering elements may maintain their respective adjustments passively, without input from controller 440.

In the example just described, the electrical signal 431 generated by position sensor 430 allows controller 440 to adjust motorized beam steering element 410 in such a way that the location of incidence of output beam 52 on output path 30 is within the spatial component of the acceptance range of the output path. However, depending on the angle of incidence of light beam 150 on beam steering element 410, output beam 52 may not necessarily be incident on output path 30 at an angle of incidence within the angular component of the acceptance range of the output path. In this event, output beam 52 will not enter the output path. The beam steering element needs to be additionally or alternatively structured to provide an adjustment of the angle of incidence of light beam 50 to enable output beam 52 to be incident on output path 30 also within the angular component of the acceptance range of the output path.

Three alternative configurations of an optical multiplexer system 500 in accordance with an embodiment of the invention will now be described with reference to FIGS. 9A-9C, 10, 11 and 12. In this embodiment, the beam steering element is structured to adjust at least the angle of incidence of light beam 50 on input port 40. Some embodiments of optical multiplexer system 500 are suitable for use in applications in which light beam 150 can be incident on the beam steering element at an angle of incidence outside the angular component of the acceptance range of input port 40. In such embodiments, the beam steering element is composed of at least an angular beam manipulator. The beam steering element steers light beam 150 to change the angle of incidence of light beam 50 on input port 40. Other embodiments of optical multiplexer system 500 are suitable for use in applications in which light beam 150 can be incident on the beam steering element at one or both of (a) a location of incidence outside the spatial component of the acceptance range of input port 40, and (b) an angle of incidence outside the angular component of the acceptance range of input port 40. In such embodiments, the beam steering element is composed of an angular beam manipulator and a beam translator in tandem. The beam steering element steers light beam 150 to change the angle of incidence and the location of incidence of light beam 50 on input port 40.

Figure 9A:
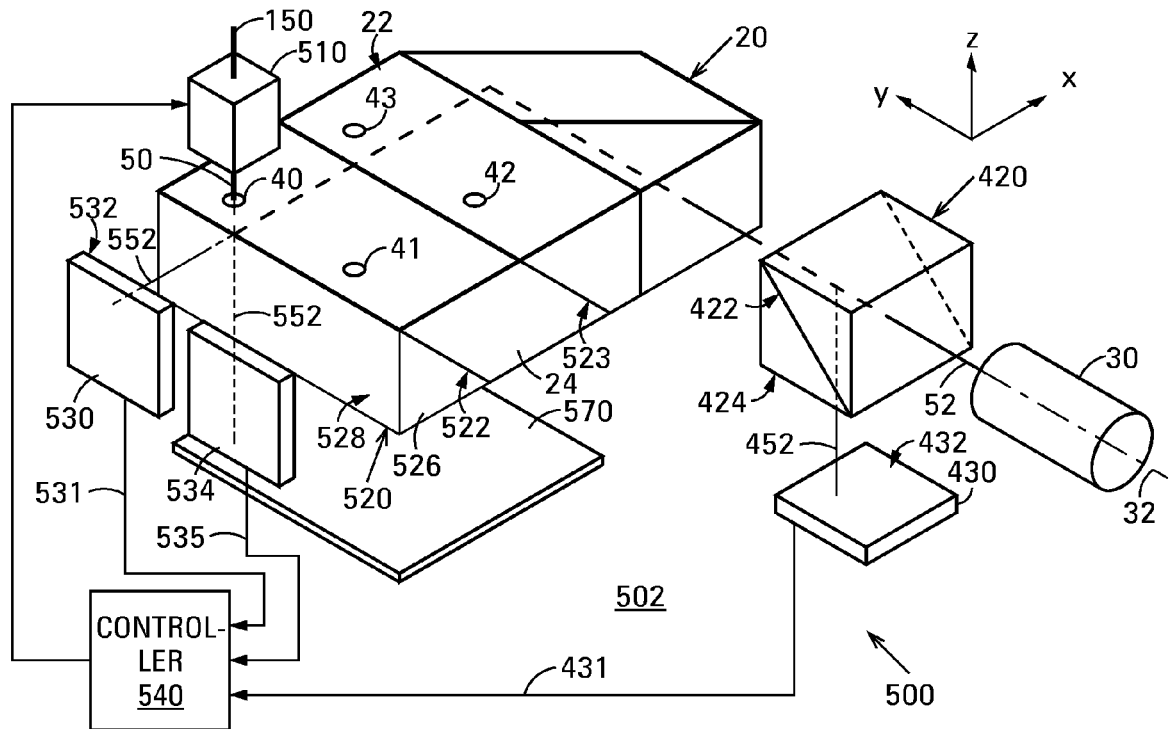
FIGS. 9A, 10 and 11 are partially-exploded isometric views showing examples of three alternative configurations of an optical multiplexer system in accordance with another embodiment of the invention.

FIG. 9A is a partially-exploded isometric view showing an example of a first configuration 502 of optical multiplexer system 500. Optical multiplexer system 500 derives beam samples from two locations spatially offset from one another along the combined paths of light beam 50 and output beam 52 between the beam steering element and output path 30 and directs the beam samples towards respective position sensors. The locations at which the beam samples are derived satisfy the condition that the optical path length between the beam steering element and the second position sensor is different from that between the beam steering element and the first position sensor. In most cases, the condition is satisfied when the optical path length between input port 40 and the second position sensor is different from that between the input port and the first position sensor. After optical multiplexer system 500 has been assembled, an initial alignment process is performed in which each beam steering element is adjusted to align output beam 52 angularly and, optionally, spatially, with the optical axis 32 of output path 30. The initial alignment process is typically performed in the factory, and does not use the electrical signals generated by the position sensors. With the beam steering element adjusted as just described, a controller that constitutes part of the optical multiplexer system (or an external controller) stores a representation of the position of the respective beam sample on each position sensor to provide a respective reference signal. Typically, the controller stores the electrical signal generated by each position sensor, or a representation of such electrical signal, as the reference signal.

Once the initial alignment process has been performed, the controller can then be operated in response to the stored reference signals and electrical signals generated by the position sensors to re-adjust the beam steering element in a manner that restores the output beam to the alignment to which it was set by the initial alignment process. Such re-adjustment of the beam steering element would be performed, e.g., in the event that the source of light beam 150 is changed. In embodiments in which the beam steering element can only change the angle of incidence of the light beam on the optical multiplexer, the beam steering element is adjusted to reduce below a first threshold the magnitude of the difference between a first offset and a second offset. The first offset is the offset of the position at which the first beam sample is incident on the first position sensor from the reference position represented by the first reference signal. The second offset is the offset of the position at which the second beam sample is incident on the second position sensor from the reference position represented by the second reference signal. The first threshold represents the angular component of the acceptance range of the output path. In embodiments in which the beam steering element can additionally change the location of incidence of the output beam on the output path, the beam steering element is additionally adjusted to reduce both of the above-mentioned offsets to below a second threshold while maintaining the difference between the offsets below the first threshold. The second threshold represents the spatial component of the acceptance range of the output path. Operation and initial alignment of optical multiplexer system 500 will be described in greater detail below with reference to FIG. 12.

Optical multiplexer system 502 is composed of optical multiplexer 20, output path 30, a motorized beam steering element adjacent each input port of optical multiplexer 20, beam splitter 420, which is a first beam splitter, a second beam splitter 520, position sensor 430, which is a first position sensor, a second position sensor for each column of input ports on optical multiplexer 20, a reflector 570 and a controller 540. To simplify the drawing, only motorized beam steering element 510 adjacent input port 40 is shown.

Output path 30 is disposed relative to optical multiplexer 20 such that light beam 50 incident on input port 40 within the original acceptance range of the input port enters the output path. Motorized beam steering element 510 is adjustable to steer light beam 150 incident on the beam steering element within an enhanced acceptance range such that light beam 50 output by the beam steering element is incident on input port 40 within the original acceptance range of the input port. Consequently, after passing through multiplexer 20, light beam 50 is incident on output path 30 as output beam 52 within the acceptance range of the output path and therefore enters the output path. The enhanced acceptance range has an angular component greater than the angular component of the original acceptance range. In some embodiments, the enhanced acceptance range additionally has a spatial component greater than the spatial component of the original acceptance range.

Multiplexer 20, output path 30, first beam splitter 420, and first position sensor 430 are structured and arranged similarly to the corresponding elements described above with reference to FIG. 8A.

Figure 9B:
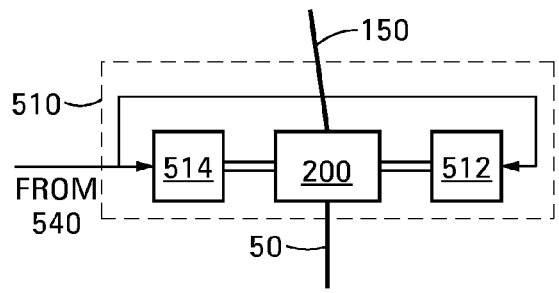
FIGS. 9B and 9C are schematic diagrams showing examples of motorized beam steering elements that may constitute part of the optical multiplexer systems shown in FIGS. 9A, 10 and 11.

FIG. 9B is a schematic diagram showing an example of motorized beam steering element 510 composed of an angular beam manipulator and a respective motor coupled to move each of the adjustable components of the angular beam manipulator. The example of motorized beam steering element 510 shown is composed of angular beam steering element 200, described above with reference to FIGS. 5A and 5B, and motors 512, 514 coupled by a suitable transmission (not shown) to rotate the wedges 210, 220 of angular beam manipulator 200. An embodiment of angular beam manipulator 250, described above with reference to FIGS. 6A and 6B, actuated by motors, or another type of motor-actuated angular beam manipulator may be used instead of angular beam manipulator 200 and motors 512, 514. Motors 512, 514 are electrically connected to an output of controller 540 whence the motors receive respective motor control signals.

Figure 9C:
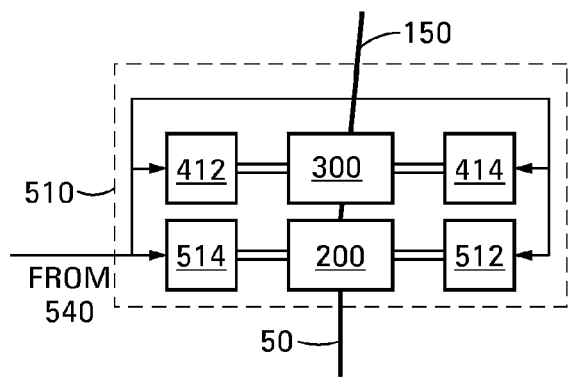

FIG. 9C is a schematic diagram showing an example of motorized beam steering element 510 suitable for use in embodiments of optical multiplexer system 502 in which either or both of position sensors 430, 530 are quadrant sensors and/or in embodiments in which light beam 150 can be incident on beam steering element 510 at a location of incidence outside the spatial component of the acceptance range of input port 40. This example of motorized beam steering element 510 is additionally composed of a beam translator and a respective motor coupled to move each of the adjustable components of the beam translator. The beam translator is arranged in tandem with the angular beam manipulator described above. In the example shown, motorized beam steering element 510 is additionally composed of beam translator 300, described above with reference to FIG. 7, and motors 412, 414 coupled by a suitable transmission (not shown) to rotate the plate 310 (FIG. 7) of beam translator 300 in pitch and in yaw, respectively, as described above with reference to FIG. 8B. Another type of motor-actuated beam translator may be used instead of beam translator 300 and motors 412, 414. Motors 412, 414 are electrically connected to an output of controller 540 whence the motors receive respective motor control signals. The construction of motorized beam manipulator 510 may differ from that described.

Referring again to FIG. 9A, second beam splitter 520 is composed of a beam splitting surface 522 on rhomboidal prism 24, which is part of optical multiplexer 20, and a right-triangular prism 526 having a hypotenuse surface affixed to beam splitting surface 522. Light beam 50 output by motorized beam steering element 510 is incident on beam-splitting surface 522 after passing through input port 40. Beam splitting surface 522 reflects most of light beam 50 into optical multiplexer 20 but transmits a sample of light beam 50 towards reflector 570 as a second beam sample 552 (see also FIG. 12).

Reflector 570 is disposed opposite second beam splitter 520 and optical multiplexer 20 to receive second beam sample 552 transmitted by beam splitting surface 522. Reflector 570 reflects second beam sample 552 back towards beam splitting surface 522. Beam splitting surface 522 reflects part of second beam sample 552 towards second position sensor 530, where the part of the second beam sample 552 reflected by beam splitting surface 522 is incident on light-sensitive surface 532.

Reflector 570 has sufficient extent in the x-y plane to receive respective beam samples derived from light beams incident on input ports 40-43. Reflector 570 reflects the beam samples derived from light beam 50 incident on input port 40 and the light beam (not shown) incident on input port 41 and transmitted by beam-splitting surface 522 back towards beam-splitting surface 522. Beam splitting surface 522 then reflects parts of such beam samples towards second position sensor 530 and second position sensor 534, respectively. Reflector 570 additionally reflects the beam samples derived from the light beams (not shown) incident on input ports 42 and 43 and transmitted by beam-splitting surface 523 back towards beam-splitting surface 523. Beam-splitting surface 523 reflects the beam samples received from reflector 570 towards beam-splitting surface 522, and beam-splitting surface 522 transmits the beam samples received from beam-splitting surface 523 towards second position sensor 534 and second position sensor 530, respectively. The example of reflector 570 has plane reflective surface disposed nominally parallel to the major surface 22 of optical multiplexer 20. Reflector 570 is depicted in FIG. 9A as an element independent of second beam splitter 520 and optical multiplexer 20 to enable reflector 570 to be shown clearly. Reflector 570 is typically implemented by silvering the surfaces of optical multiplexer 20 and second beam splitter 520 opposite the major surface 22 of the optical multiplexer. Alternatively, reflector 570 may be implemented as retroreflectors disposed opposite optical multiplexer 20 and second beam splitter 520. Each retroreflector is positioned to receive a beam sample derived from a respective one of the light beams received at input ports 40-43.

Optical multiplexer system 502 has a second position sensor for each column of input ports of optical multiplexer 20. In the example shown in which input ports 40-43 are arranged in two columns, optical multiplexer system 502 has a second position sensor 530 for input ports 40, 43 of the optical multiplexer, and a second position sensor 534 for input ports 41, 42 of the optical multiplexer. In some implementations, second position sensors 530, 534 are respective parts of a single semiconductor device. The following description of second position sensor 530 additionally applies to second position sensor 534 and second position sensor 534 will therefore not be separately described. Second position sensor 530 is similar in structure to first position sensor 430. Second position sensor 530 is disposed nominally orthogonally to the major surface 22 of optical multiplexer 20 to receive second beam sample 552 after the latter has been reflected by reflector 570 and beam-splitting surface 522. Second position sensor 530 has a light-sensitive surface 532 on which second beam sample 552 is incident. In response to second beam sample 552 incident on light-sensitive surface 532, second position sensor 530 generates an electrical signal 531 and outputs the electrical signal to controller 540. Electrical signal 531 has a measurable property that depends on the position at which second beam sample 552 is incident on light-sensitive surface 532. By analyzing electrical signal 531, circuitry within controller 540 can determine the position at which second beam sample 552 is incident on light-sensitive surface 532. Second position sensor 530 is also used to determine the position of a beam sample derived from the light beam (not shown) incident on input port 43. In this case, the beam sample is transmitted by beam-splitting surface 523, reflected by reflector 570, reflected by beam-splitting surface 523 and transmitted by beam-splitting surface 522 and is then incident on second position sensor 530.

In an embodiment, second position sensor 530 is affixed to the surface 528 of second beam splitter 520 with light sensitive surface 532 in contact with surface 528. Surface 528 is the surface of beam-splitter 520 through which beam sample 552 is output.

When controller 540 adjusts beam steering element 510 adjacent input port 40, second position sensor 530 receives beam sample 552 derived from light beam 150 incident on beam steering element 510. Alternatively, when controller 540 adjusts the beam steering element (not shown) adjacent input port 43, second position sensor 530 receives a beam sample derived from the light beam (not shown) incident on the beam steering element (not shown) adjacent input port 43. When controller 540 adjusts the beam steering element (not shown) adjacent input port 41, second position sensor 534 receives a beam sample derived from the light beam (not shown) incident on the beam steering element (not shown) adjacent input port 41. Alternatively, when controller 540 adjusts the beam steering element (not shown) adjacent input port 42, second position sensor 534 receives a beam sample derived from the light beam (not shown) incident on the beam steering element (not shown) adjacent input port 42.

Figure 10:
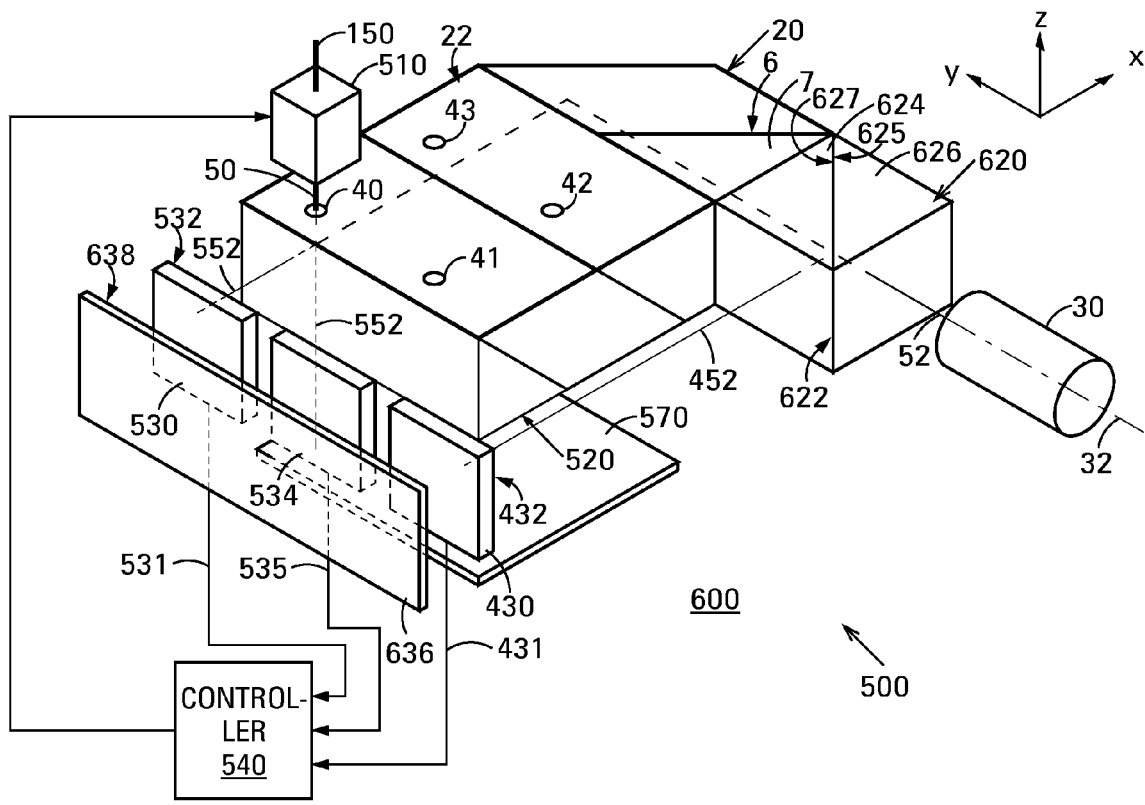

FIG. 10 is a partially-exploded isometric view showing an example of a second configuration 600 of above-described optical multiplexer system 500. In optical multiplexer system 600, first position sensor 430 and second position sensors 530, 534 are mounted next to one another on a common substrate, or are even parts of a common semiconductor device, which better defines the positional relationship between the position sensors.

Optical multiplexer system 600 is composed of optical multiplexer 20, output path 30, a motorized beam steering element adjacent each input port of optical multiplexer 20, first beam splitter 620, second beam splitter 520, first position sensor 430, a second position sensor for each column of input ports of optical multiplexer 20, reflector 570, controller 540 and a substrate 636. To simplify the drawing, only motorized beam steering element 510 adjacent input port 40 is shown.

Output path 30 is disposed relative to optical multiplexer 20 such that light beam 50 incident on input port 40 within the original acceptance range of the input port enters the output path. Motorized beam steering element 510 is adjustable to steer light beam 150 incident on the beam steering element within an enhanced acceptance range such that light beam 50 output by the beam steering element is incident on input port 40 within the original acceptance range of the input port. Consequently, after passing through multiplexer 20, light beam 50 enters output path 30 as output beam 52.

First beam splitter 620 is interposed between optical multiplexer 20 and output path 30. First beam splitter 620 is similar in structure to first beam splitter 420 described above with reference to FIG. 8A, but its beam-splitting surface 622 is oriented differently from the beam-splitting surface 422 of first beam splitter 420 described above with reference to FIG. 8A to direct a small sample of output beam 52 towards substrate 636 as beam sample 452. In the example shown, first beam splitter 620 is an independent component affixed to the surface of optical multiplexer 20 through which output beam 52 is output. First beam splitter 620 is composed of a right-triangular prism 624 affixed to triangular prism 7 of optical multiplexer 20. Right-triangular prism 624 has a hypotenuse surface 625 that provides the beam-splitting surface 622 of first beam splitter 620. In another example (not shown), right-triangular prism 624 of first beam splitter 620 and triangular prism 7 of optical multiplexer 20 are combined into a single, combined right-triangular prism (not shown). A first surface of the combined right-triangular prism provides beam-splitting surface 622 of optical multiplexer 20 and a second surface of the combined right-triangular prism provides the beam-splitting surface 622 of first beam splitter 620. First beam splitter 620 is additionally composed of a right-triangular prism 626 having a hypotenuse surface 627 juxtaposed with beam-splitting surface 622.

Optical multiplexer system 600 has a second position sensor 530, 534 for each column of input ports of optical multiplexer 20. Second position sensors 530, 534 are mounted next to one another on a major surface 638 of substrate 636 parallel to the y-z plane. In embodiments of optical multiplexer system 600 in which the input ports of optical multiplexer 20 are arranged in more than the two rows shown in FIG. 10, additional second position sensors (not shown) are mounted on substrate 636 alongside second position sensors 530, 534.

First position sensor 430 is mounted on substrate 636 offset in the y-direction from second position sensors 530, 534. Substrate 636 defines an accurate and stable positional relationship between first position sensor 430 and each of second position sensors 530, 534.

Figure 11:
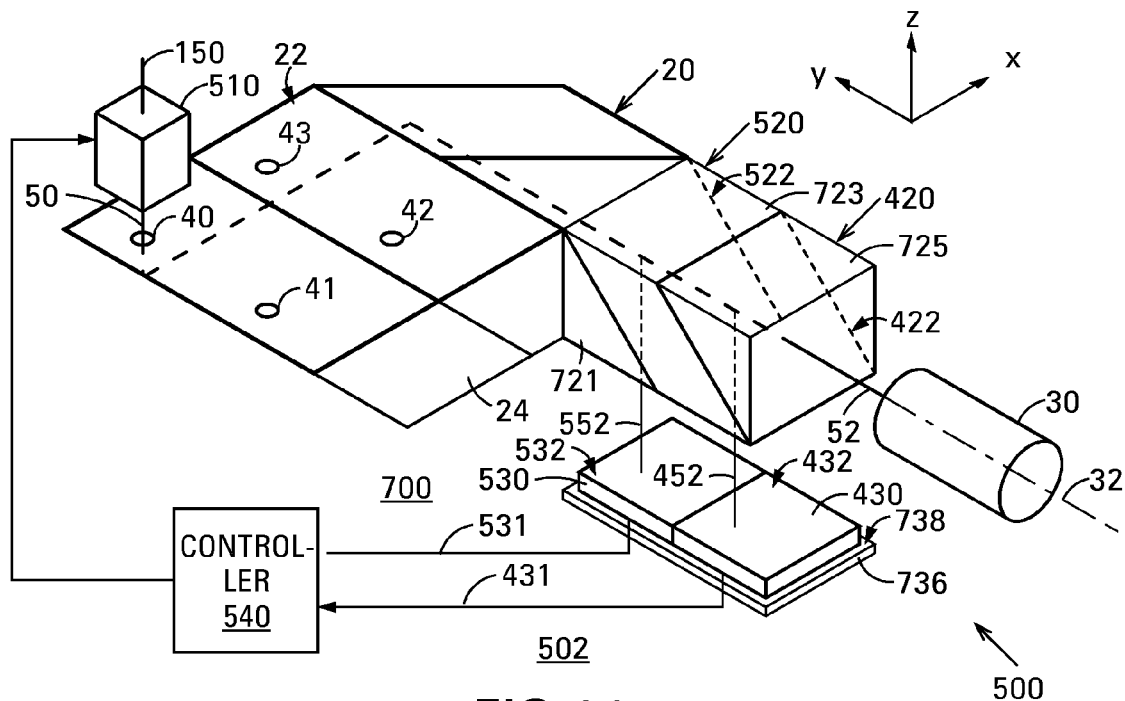

FIG. 11 is a partially-exploded isometric view showing an example of a third configuration 700 of optical multiplexer system 500. Some embodiments of optical multiplexer system 700 are suitable for use in applications in which light beam 150 can be incident on the beam steering element at an angle of incidence outside the angular component of the acceptance range of input port 40 but is incident at a location of incidence within the spatial component of the acceptance range of the input port. In such embodiments, the beam steering element is configured as shown in FIG. 9B and is composed of an angular beam manipulator. The beam steering element steers light beam 150 to change the angle of incidence of light beam 50 on input port 40. Other embodiments of optical multiplexer system 700 are suitable for use in applications in which light beam 150 can be incident on the beam steering element at a location of incidence and an angle of incidence outside the spatial component and the angular component, respectively, of the acceptance range of input port 40. In such embodiments, the beam steering element is configured as shown in FIG. 9C and is composed of an angular beam manipulator and a beam translator in tandem. The beam steering element steers light beam 150 to change the angle of incidence and the location of incidence of light beam 50 on input port 40.

Optical multiplexer system 700 is composed of optical multiplexer 20, output path 30, a motorized beam steering element adjacent each input port of optical multiplexer 20, first beam splitter 420, second beam splitter 520, first position sensor 430, second position sensor 530, and controller 540. To simplify the drawing, only motorized beam steering element 510 adjacent input port 40 is shown.

Output path 30 is disposed relative to optical multiplexer 20 such that light beam 50 incident on input port 40 within the original acceptance range of the input port enters the output path. Motorized beam steering element 510 is adjustable to steer light beam 150 incident on the beam steering element within an enhanced acceptance range such that light beam 50 output by the beam steering element is incident on input port 40 within the original acceptance range of the input port. Consequently, after passing through multiplexer 20, light beam 50 enters output path 30 as output beam 52. In this embodiment, the enhanced acceptance range has at least an angular component greater than that of the original acceptance range.

Multiplexer 20, output path 30 and beam steering element 510 are arranged similarly to the corresponding elements described above with reference to FIG. 9A.

First beam splitter 420 and second beam splitter 520 are arranged in tandem between optical multiplexer 20 and output path 30 with second beam splitter 520 interposed between optical multiplexer 20 and first beam splitter 420. A triangular prism 721, a rhomboidal prism 723 and a triangular prism 725 arranged in tandem constitute first beam splitter 420 and second beam splitter 520. Two triangular prisms may be used instead of rhomboidal prism 723. Opposed major surfaces of rhomboidal prism 723 provide the beam-splitting surface 422 of first beam splitter 420 and the beam splitting surface 522 of second beam splitter 520. The hypotenuse surfaces of triangular prisms 721 and 725 are affixed to beam splitting surfaces 522 and 422, respectively. Output beam 52 output by optical multiplexer 20 is incident on beam splitting surface 522. Beam splitting surface 522 transmits most of output beam 52 towards beam-splitting surface 422 but reflects a small sample of output beam 52 towards second position sensor 530 as a second beam sample 552. Beam splitting surface 422 transmits most of the remainder of output beam 52 towards output path 30 but reflects a small sample of the output beam towards first position sensor 430 as a first beam sample 452.

First position sensor 430 and second position sensor 530 are oriented with their light-sensitive surfaces 432, 532 disposed nominally parallel to the major surface 22 of optical multiplexer 20. First position sensor 430 and second position sensor 530 are positioned in the plane parallel to their light-sensitive surfaces 432, 532 to receive beam samples 452, 552 output by first beam splitter 420 and second beam splitter 520, respectively.

In the example shown, first position sensor 430 and second position sensor 530 are mounted next to one another on a common substrate 736 having a major surface 738 disposed parallel to the x-y plane. In other examples, first position sensor 430 and second position sensor 530 are portions of the same semiconductor device, or are different regions of a single sensor.

Figure 12:
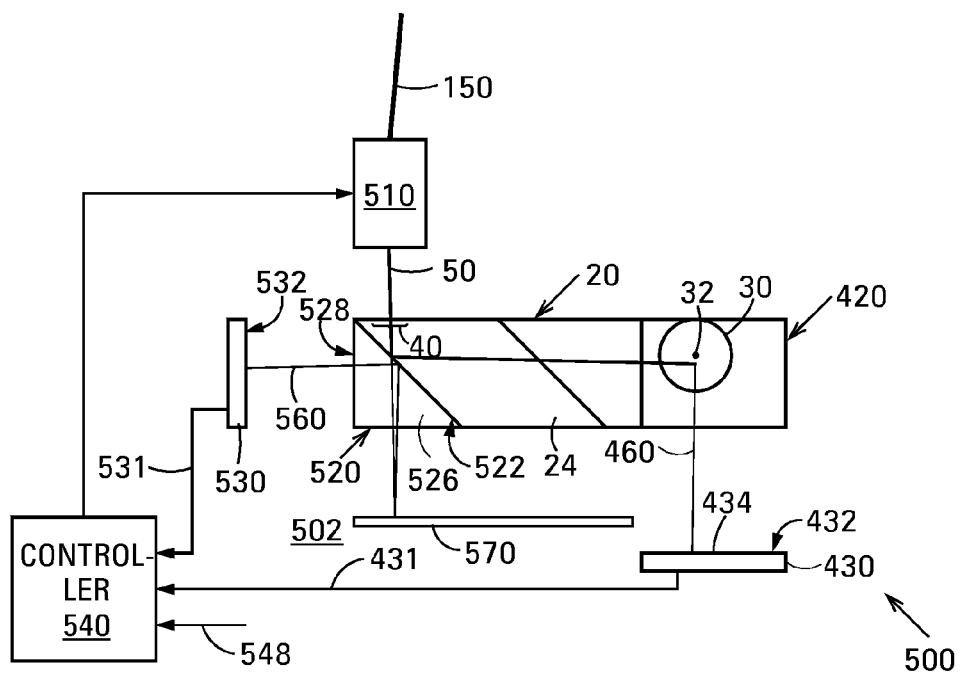
FIG. 12 is a side view illustrating the operation of the optical multiplexer systems shown in FIGS. 9A, 10 and 11.

Initial alignment of the various configurations of optical multiplexer system 500 described above with reference to FIGS. 9A, 10 and 11 will be described next with reference to FIG. 12. FIG. 12 is a side view showing an example of optical multiplexer system 502 described above with reference to FIG. 9A. Second position sensor 534 (FIG. 9A) is omitted from FIG. 12 to enable second position sensor 530 to be shown. Prior to operating optical multiplexer system 502, an initial alignment process similar to that described above with reference to FIG. 8E may be performed to used establish the positional relationship between optical axis 32 and first position sensor 430. This enables first position sensor 430 to be used to provide an indication of the offset between the location of incidence of output beam 52 on output path 30 and the optical axis 32 of the output path as the angle of incidence of output beam 52 (FIG. 9A) is changed.

During the initial alignment process, controller 540 is set to its initial alignment mode in which the controller operates in response to an external control signal 548 to adjust beam steering element 510 in a manner that aligns output beam 52 within the acceptance range, and typically at or near the center of the acceptance range, of output path 30 so that the output beam enters the output path. The alignment technique used in the initial alignment process optionally makes use of the electrical signal 431 generated by first position sensor 430 to determine the location of incidence of output beam 52 on output path 30, but does not make use of the electrical signals 431, 531 generated by position sensors 430, 530 to determine the angle of incidence of the output beam. A technique that determines the angle of incidence without using the position sensors is used instead. Since the initial adjustment process is typically performed in the factory where optical multiplexer system 500 is assembled and tested, alternative ways of determining the angle of incidence are available and are used in the initial alignment process. In one example, the output of output path 30 is monitored as beam steering element 510 is adjusted to change the angle of incidence of light beam 50 on input port 40. Beam steering element 510 is optimally adjusted when the intensity of output beam 52 measured at the output of output path 30 is greater than a predetermined fraction of the intensity of light beam 150 incident on beam steering element 510. In another example, control signal 548 causes controller 540 to command beam steering element 510 to steer light beam 150 in a pattern that searches for the boundary of the angular component of the acceptance range of output path 30. The intensity the output beam measured at the output of the output path falling below a threshold intensity indicates that the output beam has crossed the boundary of the angular component of the acceptance range and is no longer entering the output path. Once controller 540 has determined the boundary of the angular component of the acceptance range, the controller calculates the center of the angular component of the acceptance range from its measurements of the boundary of the angular component. The center of the angular component of the acceptance range provides a reasonable approximation of an alignment parallel to the optical axis 32 of output path 30. Controller 540 then commands beam steering element 510 to steer output beam 52 to the center of the angular component of the acceptance range, which maximizes the spatial component of the acceptance range and provides an optimally-located references for the re-adjustment process.

With output beam 52 incident on output path 30 such that the output beam enters the output path 30 and, in some embodiments, such that output beam 52 is aligned parallel to optical axis 32 as just described, first reference beam 460 derived from output beam 52 is incident on first position sensor 430 at a first reference position and a second reference beam 560 derived from light beam 50 is incident on second position sensor 530 at a second reference position, and respective reference signals representing the reference positions are generated. Quadrant sensors used as position sensors 430, 530 are additionally aligned with first reference beam 460 and second reference beam 560, respectively, as will be described below.

With beam steering element 510 adjusted as described above, controller 540 generates a first reference signal for first position sensor 430 and a second reference signal for second position sensor 530. The controller generates the first reference signal in response to first reference beam 460 incident on first position sensor 430. With first reference beam 460 incident on first position sensor 430, circuitry within controller 540 stores the relative amplitudes of the sensor element signals constituting electrical signal 431 to provide the first reference signal. In embodiments in which first position sensor 430 has many sensor elements, circuitry within controller 540 may subject electrical signal 431 to zigzag scanning and run-length coding to reduce the resources needed to store the reference signal. Alternatively, controller 540 stores the normalized amplitudes of those of the sensor element signals greater in amplitude than a threshold amplitude and the location address of each respective sensor element. In an embodiment in which a quadrant sensor is used as first position sensor 430, prior to storing the reference signal, the position of position sensor 430 in the plane parallel to light-sensitive surface 432 is adjusted until all four sensor elements generate respective sensor element signals greater in amplitude than a threshold amplitude. The position of such quadrant sensor is typically optimized to ensure that all four sensor elements generate respective above-threshold sensor element signals in response to each of the beam samples incident on the quadrant sensor.

Controller 540 generates the second reference signal in response to electrical signal 531 generated by second reference beam 560 incident on second position sensor 530 and stores the second reference signal in a manner similar to that just described. In an embodiment in which a quadrant sensor is used as second position sensor 530, prior to storing the reference signal, the position of position sensor 530 in the plane parallel to light-sensitive surface 532 is adjusted relative to second reference beam 560 in a manner similar to that just described. However, in optical multiplexer systems 502 and 600, position sensor 530 is positioned such that it generates four above-threshold sensor element signals in response not only to reference beam 560 derived from light beam 50 incident on input port 40, but also to the reference beam (not shown) derived from the light beam (not shown) incident on input port 43.

The beam steering elements (not shown) adjacent the remaining input ports 41-43 are sequentially illuminated with a respective light beam and the process just described in which controller 540 operates in response to external control signal 548 is repeated to adjust the respective beam steering element and to generate and store a first reference signal and a second reference signal pertaining to each of the input ports.

In optical multiplexer systems 502 and 600, controller 540 generates the second reference signals pertaining to input ports 41, 42 from the electrical signal 535 (FIGS. 9A, 10) generated by second position sensor 534.

Once the first and second reference signals pertaining to each input port have been stored in controller 540 or elsewhere, control signal 548 is discontinued and controller 540 is set to its service mode in which it maintains the adjustment to which each motorized beam steering element, including beam steering element 510, was set in the initial alignment process. Alternatively, the beam steering elements may maintain their respective adjustments passively, without input from controller 540. With beam steering element 510 so adjusted, for example, the beam steering element steers light beam 150 incident thereon such that at least the angle of incidence of light beam 50 on input port 40 is within the angular component of the acceptance range of the input port. With light beam 50 so aligned, output beam 52 (FIGS. 9A, 10, 11) is incident on output path 30 at an angle of incidence within the angular component of the acceptance range of the output path. Similar remarks apply to the beam steering elements (not shown) adjacent the remaining input ports.

Controller 540 remains in its service mode until re-adjustment of one or more of the beam steering elements is necessary. For example, re-adjustment of a beam steering element is necessary when the source of the light beam incident on the beam steering element is repaired or replaced. Alternatively, the beam steering elements can be periodically re-adjusted as part of a routine maintenance program. To re-adjust one or more of the beam steering elements, controller 540 is set to its adjustment mode. An example in which controller 540 adjusts beam steering element 510 will now be described with reference to FIG. 9A. Adjustment of the other beam steering elements is similar. Adjustment of the configurations of optical multiplexer system 500 described above with reference to FIGS. 10 and 11 is also similar.

In its adjustment mode, controller 540 provides to beam steering element 510 motor control signals that cause the beam steering element to change the location of incidence and/or position of incidence of light beam 50 on input port 40. The beam steering element changes the location and/or angle of incidence in a manner that nominally re-aligns the position of first beam sample 452 on the light sensitive surface 432 of first position sensor 430 to the reference position represented by the first reference signal and that additionally nominally re-aligns the position of second beam sample 552 on the light sensitive surface 532 of second position sensor 530 to the reference position represented by the second reference signal. The first reference signal and the second reference signal used in this process are the reference signals stored in controller 540 pertaining to input port 40. As will be described in detail below, the accuracy of the re-alignment depends on whether motorized beam steering element 510 is composed of a beam translator in addition to an angular beam manipulator. When controller 540 operates to adjust beam steering element 510 and pixellated sensors are used as position sensors 430, 530, the position monitoring circuitry within controller 540 analyzes electrical signal 431 generated by first position sensor 430 to determine the position at which first beam sample 452 is incident on the light-sensitive surface 432 of first position sensor 430. The position monitoring circuitry additionally calculates a first offset vector that represents the magnitude and direction of the offset between the position at which first beam sample 452 is incident on light-sensitive surface 432 and the reference position at which first reference beam 460 was incident on light-sensitive surface 432 during the initial alignment process. The reference position at which first reference beam 460 was incident on light sensitive surface 432 is represented by the first reference signal stored in controller 540.

Additionally, the position monitoring circuitry within controller 540 analyzes electrical signal 531 generated by second position sensor 530 to determine the position at which second beam sample 552 is incident on the light-sensitive surface 532 of second position sensor 530. The position monitoring circuitry additionally calculates a second offset vector that represents the magnitude and direction of the offset between the position at which second beam sample 552 is incident on light sensitive surface 532 and the reference position at which second reference beam 560 was incident on light-sensitive surface 532 during the initial alignment process. The reference position at which second reference beam 560 was incident is represented by the second reference signal stored in controller 540.

The position monitoring circuitry within controller 540 calculates a difference between the first offset vector and the second offset vector to provide a measure of the angle of incidence of output beam 52 on output path 30. The position monitoring circuitry represents the difference as a skew vector. The position monitoring circuitry outputs the first offset vector, the second offset vector and the skew vector to motor control circuitry within controller 540. In response to the vectors received from the position monitoring circuitry, the motor control circuitry generates motor control signals that cause the angular beam manipulator that constitutes at least part of beam steering element 510 to change the angle of incidence of light beam 50 on input port 40 in a manner that reduces the magnitude of the larger of the first offset vector and the second offset vector until the magnitude of the skew vector is reduced below a defined first threshold. A skew vector magnitude less than the first threshold corresponds to output beam 52 having an angle of incidence on output path 30 within the angular component of the acceptance range of the output path, and light beam 50 having an angle of incidence on input port 40 within the angular component of the acceptance range of the input port.

In embodiments in which motorized beam steering element 510 is additionally composed of a beam translator, the motor control circuitry within controller 540 additionally generates motor control signals that cause the beam translator to change the location of incidence of light beam 50 on input port 40 in a manner that reduces the magnitudes of the first and second offset vectors below a defined second threshold while maintaining the magnitude of the skew vector below the first threshold. A skew vector magnitude less than the first threshold and first and second offset vector magnitudes less than the second threshold corresponds to the output beam 52 having angle of incidence and a location of incidence on output path 30 within the angular component and the spatial component, respectively, of the acceptance range of the output path, and light beam 50 having an angle of incidence and a location of incidence on input port 40 within the angular component and the spatial component, respectively, of the acceptance range of the input port.

In embodiments in which quadrant sensors are used as position sensors 430, 530, the position monitoring circuitry within controller 540 initially analyzes electrical signals 431, 531 received from position sensors 430, 530 to identify the one of sensor elements on which each beam sample 452, 552 is incident. In response to this determination, motor control circuitry within controller 540 outputs motor control signals to motors 512, 514 to cause the angular beam manipulator that constitutes part of beam steering element 510 to change the angle of incidence of light beam 50 on input port 40 in a manner that causes beam samples 452, 552 to be incident on corresponding sensor elements of position sensors 430, 530. These sensor elements will be referred to as original sensor elements.

In response to the position monitoring circuitry within controller 540 determining that beam samples 452, 552 are incident on corresponding sensor elements of position sensors 430, 530, the motor control circuitry generates motor control signals that cause the beam translator that constitutes part of beam steering element 510 to change the location of incidence of light beam 50 on input port 40 in a manner that moves the positions at which beam samples 452, 552 are incident on light-sensitive surfaces 432, 532, respectively, towards respective adjacent sensor elements. These sensor elements will be referred to as destination sensor elements. The motor control circuitry within controller 540 continues to provide the motor control signals to the beam translator until one of electrical signals 431, 531 begins to contain a non-zero sensor element signal from the respective destination sensor element. This indicates that one of the beam samples 452, 552 is additionally incident on a destination sensor element in addition to the original sensor element of the respective position sensor 430, 530.

In response to the position monitoring circuitry within controller 540 detecting that one of electrical signals 431, 531 contains two non-zero sensor element signals, the motor control circuitry generates motor control signals that cause the angular beam manipulator that constitutes part of beam steering element 510 to change the angle of incidence of light beam 50 in a manner that maintains the position of incidence of the one beam sample 452, 552 on the destination sensor element and the original sensor element of the respective position sensor 430, 530 while continuing to move the position of incidence of the other beam sample towards the destination sensor element of the other position sensor. The motor control circuitry within controller 540 continues to provide the motor control signals to the angular beam manipulator until both electrical signals 431, 531 contain a non-zero sensor element signal from a respective destination sensor element. This indicates that both of the beam samples 452, 552 are incident on the original sensor element and the destination sensor element of their respective position sensors 430, 530.

In response to the position monitoring circuitry within controller 540 detecting that both electrical signals 431, 531 contain two non-zero sensor element signals, the motor control circuitry generates motor control signals that cause the beam translator that constitutes part of beam steering element 510 to change the location of incidence of light beam 50 on input port 40 in a manner that moves the positions at which beam samples 452, 552 are incident on light sensitive surfaces 432, 532, respectively, towards the reference points 434 of position sensors 430, 530. The respective paths along which the positions at which the beam samples are incident are moved are ones that maintain the incidence of the beam samples on the original sensor element and the destination sensor element of the respective position sensors. The motor control circuitry continues to provide appropriate motor control signals to the beam translator until one of electrical signals 431, 531 begins to contain four non-zero sensor element signals. This indicates that one of beam samples 452, 552 is incident on the respective reference point 434 of the respective position sensor 430, 530.

In response to the position monitoring circuitry within controller 540 detecting that one of the electrical signals 431, 531 contains four non-zero sensor element signals, the motor control circuitry within controller 540 generates motor control signals that cause the angular beam manipulator that constitutes part of beam steering element 510 to change the angle of incidence of light beam 50 on input port 40 in a manner that maintains the incidence of the one beam sample 452, 552 on the reference point of the respective position sensor 430, 530 while continuing to move the position at which the other beam sample is incident on the respective light sensitive surface towards the reference point of the respective position sensor. The motor control circuitry within controller 540 continues to provide the motor control signals to the angular beam manipulator until the position monitoring circuitry indicates that both electrical signals 431, 531 contain four non-zero sensor element signals. This indicates that each of the beam samples 452, 552 is incident on all four sensor elements of its respective position sensor 430, 530.

Finally, in response to the position monitoring circuitry within controller 540 indicating that both electrical signals 431, 531 contain four non-zero sensor element signals, the motor control circuitry within controller 540 generates motor control signals that cause beam steering element 510 to change the angle and/or location of incidence of light beam 50 on input port 40 in a manner that causes small changes in the position at which beam sample 452 is incident on position sensor 430 and the position at which beam sample 552 is incident on position sensor 530 until the sensor element signals constituting electrical signal 431 have relative amplitudes that differ from those of the first reference signal stored in controller 540 by less than a defined threshold and the sensor element signals constituting electrical signal 531 have relative amplitudes that differ from those of the second reference signal stored in controller 540 by less than the threshold. When these conditions are satisfied, the position monitoring circuitry stops the adjustment process. Differences less than the threshold correspond to output beam 52 having a location of incidence and angle of incidence on output path 30 within the spatial component and the angular component, respectively, of the acceptance range of the output path, and light beam 50 having a location of incidence and angle of incidence on input port 40 within the spatial component and the angular component, respectively, of the acceptance range of the input port. If necessary, the beam steering elements adjacent the remaining input ports 41-43 are re-adjusted using a re-adjustment process similar to that just described. Once the re-adjustment process has been completed, controller 540 is set to its service mode in which it maintains the adjustment to which each beam steering element, including beam steering element 510, was set during the readjustment process. Alternatively, the beam steering elements may maintain their respective adjustments passively, without input from controller 540.

The motor control circuitry within controller 540 may use table-based techniques, vector techniques or other techniques to generate the motor control signals from the inputs received from the position monitoring circuitry. Embodiments of controller 540 that perform alignment processes different from those exemplified above to achieve the above-described alignment of output beam 52 with output path 30 can alternatively be used.

As noted above, in the single-position sensor optical multiplexer system 400 described above with reference to FIGS. 8A-8F, beam steering element 410 can adjust the location of incidence of output beam 52 on output path 30 so that the location of incidence is within the spatial component of the acceptance range of the output path, but the angle of incidence of the output beam may be outside the angular component of the acceptance range of the output path notwithstanding adjustment of beam steering element 410. As described above with reference to FIG. 3B, a focusing lens converts an angular deviation to a spatial deviation.

Figure 13A:
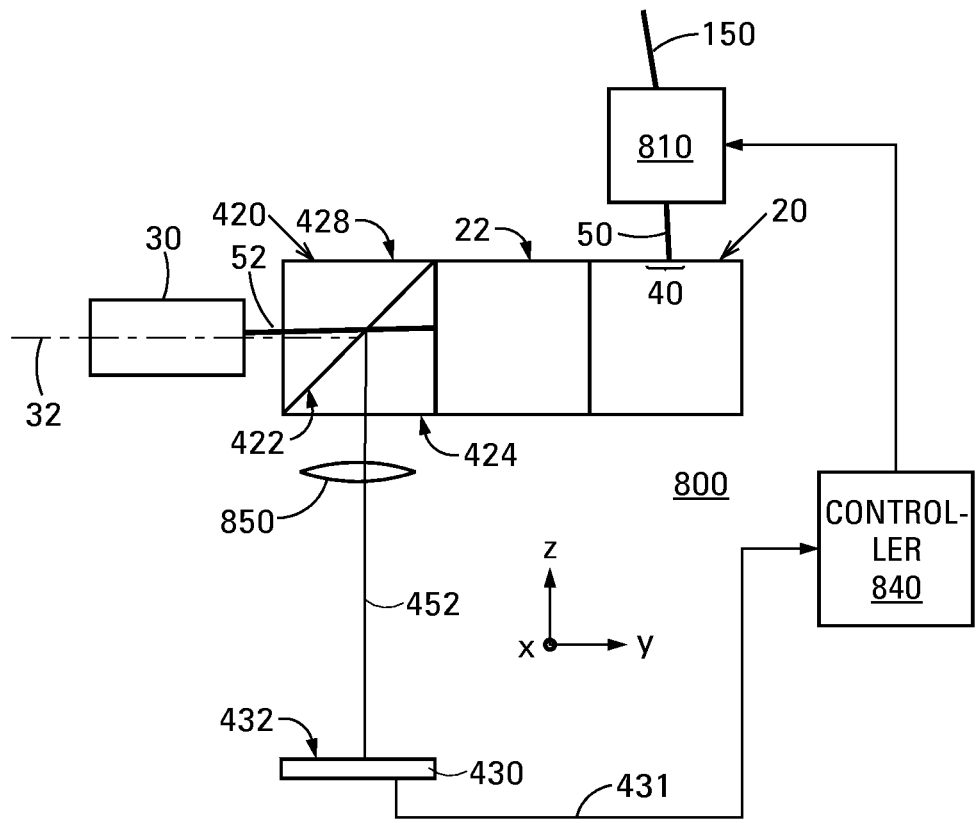
FIG. 13A is a side view showing an example of an optical multiplexer system in accordance with another embodiment of the invention.

FIG. 13A is a side view showing an example of an optical multiplexer system 800 in accordance with another embodiment of the invention. In optical multiplexer system 800, a single position sensor is used to determine the angle of incidence of output beam 52 on output path 30. Determining the angle of incidence this way enables the beam steering element to be adjusted such that the angle of incidence of light beam 50 on input port 40 is within the angular component of acceptance range of the input port, and output beam 52 is incident on output path 30 within the angular component of the acceptance range of the output path. Optical multiplexer system 800 is suitable for use in applications in which light beam 150 can be incident on the beam steering element with an angle of incidence outside the angular component of the acceptance range of input port 40 but cannot be incident at a location of incidence outside the spatial component of the acceptance range of the input port. In optical multiplexer system 800, the beam steering element is composed of only an angular beam manipulator. The beam steering element steers light beam 150 to change only the angle of incidence of light beam 50 on input port 40.

Optical multiplexer system 800 is composed of optical multiplexer 20, output path 30, a motorized beam steering element adjacent each input port of optical multiplexer 20, beam splitter 420, position sensor 430, a focusing lens 850 and a controller 840. To simplify the drawing, only motorized beam steering element 810 adjacent input port 40 is shown. Output path 30 is disposed relative to optical multiplexer 20 such that light beam 50 incident on input port 40 within the original acceptance range of the input port enters the output path. Motorized beam steering element 810 is located adjacent input port 40, and is adjustable to steer light beam 150 incident on the beam steering element within an enhanced acceptance range such that light beam 50 output towards input port 40 is incident on the input port within the original acceptance range of the input port. Consequently, after passing through multiplexer 20, light beam 50 enters output path 30 as output beam 52. In this embodiment, the enhanced acceptance range has an angular component greater than the angular component of the original acceptance range.

Focusing lens 850 is located adjacent surface 424 of beam splitter 420 between beam splitter 420 and position sensor 430. Position sensor 430 is spaced in the z-direction from lens 850 by a distance nominally equal to the focal length of the lens. Thus, position sensor 430 is located in the focal plane of focusing lens 850. The resolution with which the angle of incidence of output beam 52 on output path 30 can be adjusted depends on the spatial resolution of position sensor 430 and the ratio of the optical path length between output path 30 and lens 850 via beam splitter 420 to the focal length of lens 850. Thus, for a given spatial resolution of position sensor 430, an embodiment of lens 850 having a longer focal length gives a higher resolution than an embodiment having a shorter focal length. The optical path between lens 850 and position sensor 430 may be folded by means of one or more mirrors, prisms or other suitable optical elements to enable a long focal length embodiment of lens 850 to be used without the increase in the maximum dimensions of optical multiplexer system 800 that would result if the straight optical path illustrated in FIG. 13A were used.

Figure 13B:
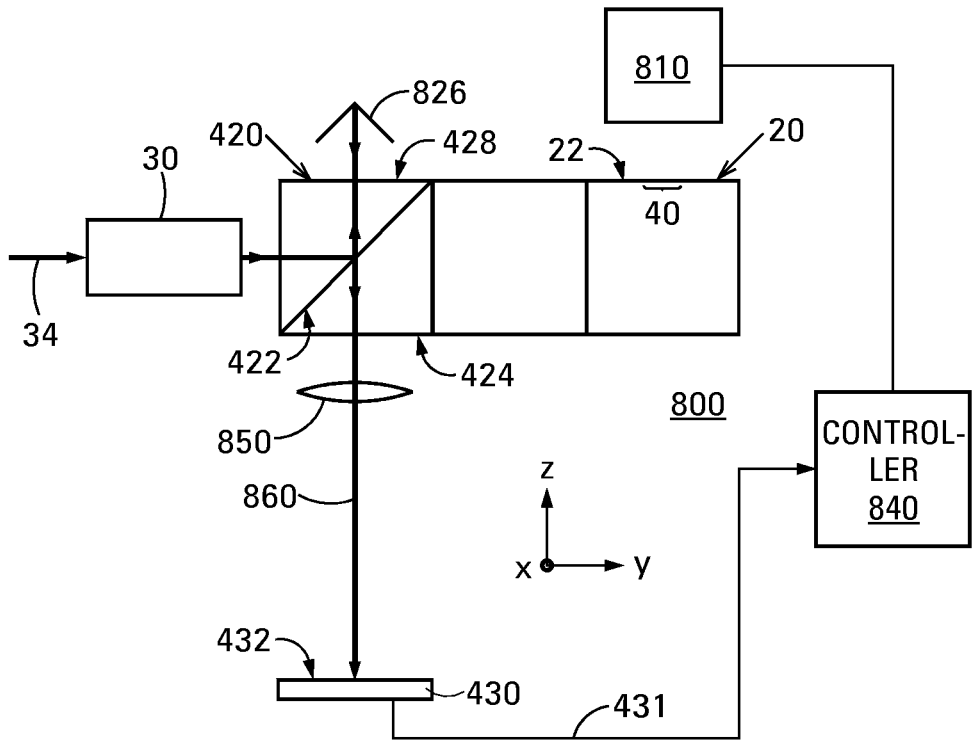
FIG. 13B is a side view illustrating the calibration of the optical multiplexer system shown in FIG. 13A.

Prior to being used to adjust beam steering element 810, position sensor 430 is calibrated to identify a position of incidence on position sensor 430 corresponding to output beam 52 having an angle of incidence of zero on output path 30. FIG. 13B shows an example of optical multiplexer system 800 during calibration. A retroreflector 826, for example, a cube corner, is positioned adjacent surface 428 of beam splitter 420. Surface 428 is opposite surface 424. Light 34 is directed backwards through output path 30 towards optical multiplexer 20 and is output by the output path as a light beam directed towards beam splitting surface 422 of beam splitter 420. Beam-splitting surface 422 of beam splitter 420 reflects part of the light beam output by output path 30 towards retroreflector 426. Retroreflector 426 reflects the light beam received from beam-splitting surface 422 back towards the beam-splitting surface. Beam-splitting surface 422 transmits part of the light beam received from retroreflector 426 towards lens 850. Lens 850 focuses the light beam received from beam-splitting surface 422 on the light-sensitive surface 432 of position sensor 430 as reference beam 860. Controller 840 is set to a calibration mode.

The position in the x-y plane of a quadrant sensor used as position sensor 430 is aligned relative to reference beam 860 using a process similar to that described above with reference to FIG. 8E. Once aligned with reference beam 860, position sensor 430 is fixed in position and, with reference beam 860 continuing to be incident on light-sensitive surface 432, circuitry within controller 840 stores the relative amplitudes of the sensor element signals constituting electrical signal 431 to provide a reference signal.

A pixellated sensor used as position sensor 430 is typically mounted at a fixed location in the x-y plane such that reference beam 860 is incident approximately at the center of light-sensitive surface 432. In embodiments in which sensor elements 436 are comparable in size to the diameter of the reference beam, or are larger, alignment accuracy is improved by locating position sensor 430 such that reference beam 860 is incident on parts of at least four sensor elements. With reference beam 860 incident on light sensitive surface 432 as described above, circuitry within controller 840 stores the relative amplitudes of the sensor element signals constituting electrical signal 431 to provide the above-described reference signal. In embodiments in which position sensor 430 has many sensor elements, circuitry within controller 840 may subject electrical signal 431 to zigzag scanning and run-length coding, for example, to reduce the resources needed to store the reference signal.

Once the reference signal for each beam steering element has been stored within controller 840 or elsewhere, controller 840 is set to its service mode in which it maintains the adjustment to which each beam steering element, including beam steering element 810, was set during the calibration process just described. Alternatively, the beam steering elements may maintain their respective adjustments passively, without input from controller 840. With beam steering element 810 so adjusted, for example, the beam steering element steers light beam 150 incident thereon to change the angle of incidence of light beam 50 on input port 40 to within the angular component of the acceptance range of the input port. With light beam 50 so aligned, output beam 52 is incident on output path 30 at an angle of incidence within the angular component of the acceptance range of the output path. Similar remarks apply to the beam steering elements (not shown) adjacent the remaining input ports.

Controller 840 remains in its service mode until adjustment of one or more of the beam steering elements is necessary. For example, adjustment of a beam steering element is necessary when the source of the light beam incident on the beam steering element is repaired or replaced. Alternatively, the beam steering elements can be periodically adjusted as part of a routine maintenance program. To adjust one or more of the beam steering elements, controller 840 is set to its adjustment mode. An example in which controller 840 adjusts beam steering element 810 will now be described. Adjustment of the other beam steering elements is similar.

Referring again to FIG. 13A, which shows controller 840 operating in its adjustment mode, circuitry within controller 840 operates in a manner similar to that described above with reference to FIG. 8F to adjust beam steering element 810. However, in this embodiment, the motor control signals generated by controller 840 cause the angular beam manipulator that constitutes beam steering element 810 to change the angle of incidence of light beam 50 on input port 40 in a manner that reduces the magnitude of a displacement vector below a defined threshold. The displacement vector represents the displacement of the position at which beam sample 452 is incident on light sensitive surface 432 from the reference position at which reference beam 860 was incident on light-sensitive surface 432 during calibration. Since lens 850 converts a non-zero angle of incidence into a displacement, the displacement vector represents the angle of incidence of output beam 52 on output path 30. The reference position at which the reference beam was incident is represented by the reference signal. A displacement vector magnitude less than the threshold corresponds to output beam 52 having an angle of incidence on output path 30 within the angular component of the acceptance range of the output path, and light beam 50 having an angle of incidence on input port 40 within the angular component of the acceptance range of the input port. If necessary, the beam steering elements (not shown) adjacent the remaining input ports 41-43 are adjusted using an adjustment process similar to that just described. Once the adjustment process has been completed, controller 840 is set to its service mode in which it maintains the adjustment to which each beam steering element, including beam steering element 810, was set during the re-adjustment process. Alternatively, the beam steering elements may maintain their respective adjustments passively, without input from controller 840.

Another example of optical multiplexer system 800 can be configured to allow light beam 150 to be incident on beam steering element 810 at a location outside the spatial component of the acceptance range of input port 40. In such example, adjustable beam steering element 810 is composed of an angular beam manipulator and a beam translator in tandem, and lens 850 is removable from the path between beam splitter 420 and position sensor 430. With lens 850 removed from the above-mentioned path, optical multiplexer system 800 is configured similarly to optical multiplexer system 400 described above with reference to FIGS. 8A-8F. With lens 850 in place, such example of optical multiplexer system 800 is calibrated in the manner described above with reference to FIG. 13B to generate a first reference signal, and, with lens 850 removed, optical multiplexer system 800 is additionally initially aligned in a manner similar to that described above with reference to FIG. 8E to generate a second reference signal that represents the position of the optical axis 32 of output path 30.

Once calibrated and initially aligned, the controller 840 of the additional example of optical multiplexer system 800 is set to its service mode in which it maintains the adjustment to which each beam steering element, including beam steering element 810, was set during the above-described calibration and initial alignment processes. Alternatively, the beam steering elements may maintain their respective adjustments passively, without input from controller 840.

Controller 840 remains in its service mode until adjustment of one or more of the beam steering elements is necessary. To adjust one or more of the beam steering elements, controller 840 is set to its adjustment mode. Optical multiplexer system 800 is then operated with lens 850 in position as described above with reference to FIG. 13A to cause the angular beam manipulator that constitutes part of beam steering element 810 to set the angle of incidence of light beam 50 on input port 40 to an angle of incidence within the angular component of the acceptance range of the input port. During this adjustment, the angle of incidence of light beam 50 on input port 40 is adjusted until the displacement between the position at which beam sample 452 is incident on light-sensitive surface 432 and the reference position defined by the first reference signal is less than a first threshold. Then, lens 850 is removed from the path between beam splitter 420 and position sensor 430 and optical multiplexer system 800 is operated in a manner similar to that described above with reference to FIG. 8F to cause the beam translator that additionally constitutes part of beam steering element 810 to change the location of incidence of light beam 50 on input port 40 to a location of incidence within the spatial component of the acceptance range of the input port. During this adjustment, the location of incidence of light beam 50 on input port 40 is adjusted until the displacement between the position at which beam sample 452 is incident on light-sensitive surface 432 and the reference position defined by the second reference signal is less than a second threshold. Once the adjustment process has been completed, controller 840 is set to its service mode in which it maintains the adjustment to which each beam steering element, including beam steering element 810, was set during the adjustment process. Alternatively, the beam steering elements may maintain their respective adjustments passively, without input from controller 840.

Figure 14:
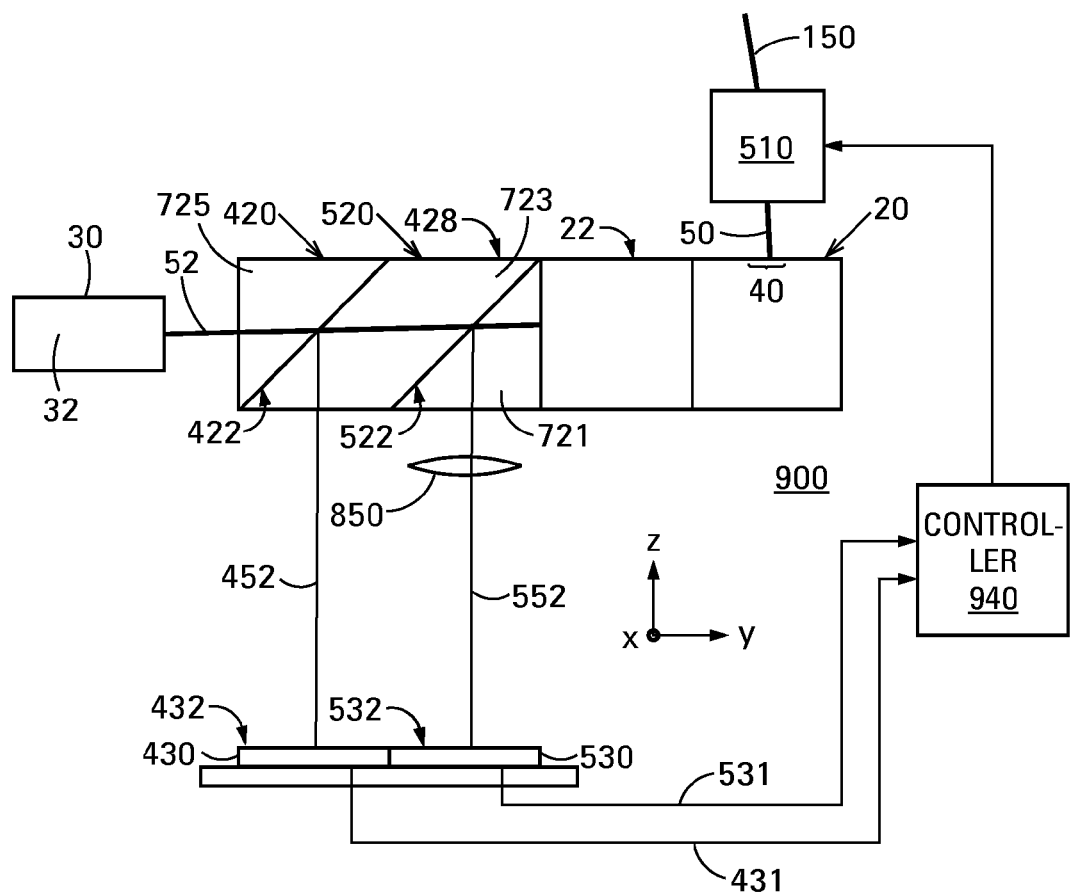
FIG. 14 is a side view showing an example of an optical multiplexer system in accordance with another embodiment of the invention.

FIG. 14 is a side view showing an example of an optical multiplexer system 900 in accordance with an embodiment of the invention. Optical multiplexer system 900 is based on optical multiplexer system 700 described above with reference to FIG. 11. In optical multiplexer system 900, a first beam splitter and a first position sensor are used to determine the location of incidence of output beam 52 on output path 30 and a second beam splitter, a second position sensor and a focusing lens are used to determine the angle of incidence of output beam 52 on output path 30. This enables the controller to adjust the beam steering element such that the location of incidence and the angle of incidence of light beam 50 on input port 40 are within the spatial component and the angular component, respectively, of the acceptance range of the input port. Optical multiplexer system 900 is suitable for use in applications in which light beam 150 can be incident on the beam steering element at a location of incidence and with an angle of incidence outside the spatial component and the angular component, respectively, of the acceptance range of input port 40. In optical multiplexer system 900, the beam steering element is composed of a beam translator and an angular beam manipulator in tandem. The beam steering element steers light beam 150 to change either or both of the position of incidence and the angle of incidence of light beam 50 on input port 40.

Optical multiplexer system 900 is composed of optical multiplexer 20, output path 30, a motorized beam steering element adjacent each input port of optical multiplexer 20, first beam splitter 420, second beam splitter 520, first position sensor 430, second position sensor 530, controller 940 and focusing lens 850. To simplify the drawing, only motorized beam steering element 510 adjacent input port 40 is shown.

Output path 30 is disposed relative to optical multiplexer 20 such that light beam 50 incident on the input port within the original acceptance range of the input port enters the output path. Motorized beam steering element 510 is adjustable to steer light beam 150 incident on the beam steering element within an enhanced acceptance range such that light beam 50 output by the beam steering element is incident on input port 40 within the original acceptance range of the input port. Consequently, after passing through multiplexer 20, light beam 50 enters output path 30 as output beam 52. In this embodiment, the enhanced acceptance range has at least an angular component greater than that of the original acceptance range.

First beam splitter 420 and second beam splitter 520 are arranged in tandem between optical multiplexer 20 and output path 30 with second beam splitter 520 interposed between optical multiplexer 20 and first beam splitter 420. In the example shown, a triangular prism 721, a rhomboidal prism 723 and a triangular prism 725 arranged in tandem constitute first beam splitter 420 and second beam splitter 520 in a manner similar to that described above with reference to FIG. 11.

In optical multiplexer system 900, focusing lens 850 is interposed between second beam splitter 520 and second position sensor 530, and second position sensor 530 is located in the focal plane of lens 850 in a manner similar to that described above with reference to FIG. 13A. Lens 850, second position sensor 530, part of controller 940 and the angular beam manipulator that constitutes part of beam steering element 510 are calibrated in a manner similar to that described above with reference to FIG. 13B and are operated in a manner similar to that described above with reference to FIG. 13A to adjust the angle of incidence of light beam 50 on input port 40. First position sensor 430, part of controller 940 and the beam translator that constitutes part of beam steering element 510 are initially aligned in a manner similar to that described above with reference to FIG. 8E and are operated in a manner similar to that described above with reference to FIG. 8F to adjust the location of incidence of light beam 50 on input port 40.

FIGS. 8A, 9A, 10, 11, 12, 13A and 14 show examples in which motor control circuitry within a controller provides motor control signals to a motorized beam steering element to adjust the motorized beam steering automatically. In other examples, the beam steering element is adjusted by hand, typically with the aid of one or more suitable adjustment tools, and the controller includes display circuitry instead of the above-described motor control circuitry. The display circuitry converts the signals generated by position monitoring circuitry within the controller into a display signal, such as a VGA signal, a DVI signal, an HDMI signal or another signal suitable for driving a display, such as a handheld display or a CRT or LCD monitor. In response to the display signal, the monitor displays information indicating the adjustments to be made by hand to the beam steering element. The information can be textual information, such as "rotate the first wedge to an azimuth of 22.3 degrees," or can be graphical information, such as, for each position sensor, a graphical representation of the offset between the current position of incidence of the respective beam sample and the reference position of incidence of the respective reference beam during the initial alignment process or the calibration process.

In the above-described optical multiplexer systems 400, 500, 600, 700, 800, 900, controllers 440, 540, 840, 940 can be implemented in hardware such as an integrated circuit having bipolar, N-MOS, P-MOS or CMOS devices. Design libraries comprising designs for such circuit elements suitable for implementing the above-described circuitry of the above-mentioned controllers are commercially available can be used to design such hardware implementation of the above-mentioned controllers.

The above-mentioned controllers can alternatively be implemented in pre-fabricated hardware devices such as an application-specific integrated circuit (ASIC) or a field-programmable gate array (FPGA). Design libraries comprising designs for implementing the above-described circuitry of the above-mentioned controllers in such pre-fabricated hardware devices are commercially available can be used to configure such pre-fabricated hardware devices to implement the above-mentioned controllers.

The above-mentioned controllers can alternatively be implemented in software running on a suitable computational device (not shown) such as a microprocessor or a digital signal processor (DSP). The above-mentioned controllers may additionally constitute part of a computational device that performs functions in addition to those described. Programming modules capable of programming a computational device to provide the functions of the above-described circuitry of the above-mentioned controllers are commercially available and may be used to program a computational device to provide a software implementation of the above-mentioned controllers. In such software implementations of the above-mentioned controllers, the various circuitry described in this disclosure is typically ephemeral, and exists only temporarily as the program executes.

The program in response to which the computational device operates can be fixed in a suitable computer-readable medium (not shown) such as a floppy disk, a hard disk, a CD-ROM, a DVDROM, a flash memory, a read-only memory or a programmable read-only memory. The program is then transferred to a non-volatile memory that forms part of the computational device, or is external to the computational device. Alternatively, the program can be transmitted to the nonvolatile memory of the computational device by a suitable data link.

This disclosure describes the invention in detail using illustrative embodiments. However, the invention defined by the appended claims is not limited to the precise embodiments described.

We claim:

1. An optical multiplexer system, comprising:
   an optical multiplexer comprising an input port characterized by an original acceptance range;
   an optical path disposed relative to the optical multiplexer such that a light beam incident on the input port within the original acceptance range enters the output path; and
   an automatically adjustable beam steering element located adjacent the input port, the beam steering element being configured to enhance the acceptance range of the input port, wherein the beam steering element is adjustable such that a light beam incident on the beam steering element within an enhanced acceptance range enters the output path as an output beam, the enhanced acceptance range at least angularly greater than the original acceptance range.

2. The optical multiplexer system of claim 1, in which the adjustable beam steering element is additionally adjustable such that the enhanced acceptance range is additionally spatially greater than the original acceptance range.

3. The optical multiplexer system of claim 1, in which the adjustable beam steering element comprises an adjustable angular beam manipulator.

4. The optical multiplexer system of claim 1, in which the adjustable beam steering element comprises an adjustable beam translator.

5. The optical multiplexer system of claim 1, in which the adjustable beam steering element comprises an adjustable angular beam manipulator and an adjustable beam translator in tandem.

6. The optical multiplexer system of claim 1, additionally comprising:
   a beam splitter interposed between the optical multiplexer and the output path; and
   a position sensor operable to receive a beam sample output by the beam splitter, and operable to generate an electrical signal representing a position at which the beam sample is incident thereon.

7. The optical multiplexer system of claim 6, in which:
   the output beam is incident on the output path at a location of incidence; and
   the electrical signal contains information regarding the location of incidence of the output beam on the output path.

8. The optical multiplexer system of claim 6, additionally comprising a focusing lens interposed between the beam splitter and the position sensor.

9. The optical multiplexer system of claim 8, in which:
   the output beam is incident on the output path at an angle of incidence; and
   the electrical signal contains information regarding the angle of incidence of the output beam on the output path.

10. The optical multiplexer system of claim 8, in which:
    the adjustable beam steering element comprises a motorized adjustable beam steering element;
    the optical multiplexer system additionally comprises:
      a retroreflector located to reflect a reference beam towards the position sensor, the reference beam derived by the beam splitter from light directed towards the optical multiplexer from the output path, and
      a controller operable to control the motorized beam steering element in response to the electrical signal to steer the light beam such that the light beam output by the beam steering element is incident on the input port within the acceptance range of the input port, the controller comprising circuitry operable to store a reference signal generated by the position sensor in response to the reference beam, the reference signal representing an angle of incidence of zero on the output path.

11. The optical multiplexer system of claim 6, in which:
    the beam splitter is a first beam splitter and is located along an optical path between the input port and the output path;
    the beam sample is a first beam sample;
    the position sensor is a first position sensor and is operable to generate a first electrical signal; and
    the optical multiplexer system additionally comprises:
      a second beam splitter located along the optical path between the input port and the output path at a position offset from the first beam splitter, and
      a second position sensor located to receive a second beam sample output by the second beam splitter and operable to generate a second electrical signal representing a position at which the second beam sample is incident thereon.

12. The optical multiplexer system of claim 11, in which:
    the output beam is incident on the output path at an angle of incidence and at a location of incidence; and
    the first electrical signal and the second electrical signal collectively contain information regarding the angle of incidence and the location of incidence of the output beam on the output path.

13. The optical multiplexer system of claim 11, additionally comprising a reflector located to receive the second beam sample and oriented to reflect the second beam sample back to the second beam splitter for reflection to the second position sensor.

14. The optical multiplexer system of claim 11, in which the first position sensor and the second position sensor are located side-by-side.

15. The optical multiplexer system of claim 11, in which:
    the output beam is incident on the output path at an angle of incidence and at a location of incidence;
    the optical multiplexer system additionally comprises a focusing lens interposed between one of the first position sensor and the second position sensor and a respective one of the first beam splitter and the second beam splitter; and
    the electrical signal generated by the one of the first position sensor and the second position sensor contains information regarding the angle of incidence of the output beam on the output path, and the electrical signal generated by the other of the first position sensor and the second position sensor contains information regarding the location of incidence of the output beam on the output path.

16. The optical multiplexer system of claim 11, in which optical paths from the beam steering element to the first position sensor and from the beam steering element to the second position sensor, respectively, differ in path length.

17. The optical multiplexer system of claim 6, in which:
    the adjustable beam steering element comprises a motorized adjustable beam steering element; and
    the optical multiplexer system additionally comprises a controller operable to control the motorized beam steering element in response to the electrical signal to steer the light beam such that the light beam output by the beam steering element is incident on the input port within the acceptance range of the input port.

18. The optical multiplexer system of claim 17, in which:
    the beam sample incident on the position sensor with the adjustable beam steering element initially aligned such that the output beam enters the output path constitutes a reference beam; and
    the controller comprises circuitry operable to store a reference signal generated by the position sensor in response to the reference beam, the reference signal representing a reference position on the position sensor.

19. The optical multiplexer system of claim 18, in which:
    the position sensor comprises a quadrant sensor, the quadrant sensor having a light-sensitive surface and comprising sensor elements; and
    the position sensor is aligned in a plane nominally parallel to the light-sensitive surface such that the reference beam is incident on all of the sensor elements.

20. The optical multiplexer system of claim 18, in which:
    the optical multiplexer system additionally comprises:
      an additional beam splitter located along an optical path between the input port and the output path at a position offset from the beam splitter, and
      an additional position sensor located to receive an additional beam sample output by the additional beam splitter and operable to generate an additional electrical signal representing a position of incidence of the additional beam sample thereon, the additional beam sample incident on the additional position sensor with the adjustable beam steering element initially aligned such that the output beam enters the output path constituting an additional reference beam; and the controller additionally comprises circuitry operable to store an additional reference signal generated by the additional position sensor in response to the additional reference beam as an additional reference position on the additional position sensor.

21. The optical multiplexer system of claim 20, in which the controller comprises:

circuitry operable to determine a first offset between the position of incidence of the beam sample and a reference position on the position sensor;

circuitry operable to determine a second offset between the position of incidence of the additional beam sample and a reference position on the additional position sensor; and circuitry operable to control the motorized beam steering element to change the angle of incidence of the light beam on the input port in a manner that reduces the difference between the first offset and the second offset to less than a threshold difference.

* * * * *

UNITED STATES PATENT AND TRADEMARK OFFICE
CERTIFICATE OF CORRECTION

| | | |
|---|---|---|
| PATENT NO. | : 8,369,661 B2 | Page 1 of 1 |
| APPLICATION NO. | : 12/390322 | |
| DATED | : February 5, 2013 | |
| INVENTOR(S) | : Alan Graham et al. | |

It is certified that error appears in the above-identified patent and that said Letters Patent is hereby corrected as shown below:

In column 38, line 46, in claim 1, delete "optical" and insert -- output --, therefor.

Signed and Sealed this
Nineteenth Day of March, 2013

Teresa Stanek Rea
*Acting Director of the United States Patent and Trademark Office*